United States Patent
Huyn et al.

(10) Patent No.: US 10,309,372 B2
(45) Date of Patent: Jun. 4, 2019

(54) ADAPTIVE POWER GENERATION MANAGEMENT

(71) Applicant: Hitachi, Ltd., Tokyo (JP)

(72) Inventors: Nam Huyn, Santa Clara, CA (US); Chandrasekar Venkatraman, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/605,184

(22) Filed: May 25, 2017

(65) Prior Publication Data

US 2018/0340515 A1   Nov. 29, 2018

(51) Int. Cl.
| | |
|---|---|
| *F03D 9/25* | (2016.01) |
| *H02K 7/18* | (2006.01) |
| *F03D 7/04* | (2006.01) |
| *F03D 7/02* | (2006.01) |
| *F03D 17/00* | (2016.01) |
| *F03D 9/11* | (2016.01) |

(52) U.S. Cl.
CPC ............ *F03D 9/257* (2017.02); *F03D 7/028* (2013.01); *F03D 7/045* (2013.01); *F03D 7/046* (2013.01); *F03D 7/048* (2013.01); *F03D 17/00* (2016.05); *H02K 7/183* (2013.01); *F03D 9/11* (2016.05); *F05B 2260/821* (2013.01); *F05B 2260/8211* (2013.01); *F05B 2260/84* (2013.01); *F05B 2270/32* (2013.01); *F05B 2270/335* (2013.01); *F05B 2270/404* (2013.01)

(58) Field of Classification Search
None
See application file for complete search history.

(56) References Cited

U.S. PATENT DOCUMENTS

| | | |
|---|---|---|
| 8,620,634 B2 | 12/2013 | Foslien Graber et al. |
| 2016/0181811 A1 | 6/2016 | Liu et al. |

FOREIGN PATENT DOCUMENTS

| | | |
|---|---|---|
| EP | 3 118 783 A1 | 1/2017 |

OTHER PUBLICATIONS

Seong-Jun Kim, et al., "A Clustering Approach to Wind Power Prediction based on Support Vector Regression", International Journal of Fuzzy Logic and Intelligent Systems, Jun. 2012, vol. 12, No. 2, pp. 108-112. http://dx.doi.org/10.5391/IJFIS.2012.12.2.108 pISSN 1598-2645 eISSN 2093-744X.

(Continued)

*Primary Examiner* — Carlos R Ortiz Rodriguez
(74) *Attorney, Agent, or Firm* — Mattingly & Malur, PC

(57) ABSTRACT

In some examples, a system receives first sensor data from respective wind turbines of a plurality of wind turbines. For instance, the first sensor data may include at least a power output and a wind speed per time interval. The system trains at least one respective model for each respective wind turbine based on the first sensor data received from that respective wind turbine. Further, the system receives, for a second time period, respective second sensor data from the respective wind turbines. The system executes, using the respective second sensor data, the respective model trained using the first sensor data received from that respective wind turbine to determine, for each respective wind turbine, a predicted power output for an upcoming period. The predicted power outputs may be aggregated to determine a total predicted power output and at least one action is performed based on the total predicted power output.

20 Claims, 12 Drawing Sheets

(56) References Cited

OTHER PUBLICATIONS

Oliver Kramer, et al., "Support Vector Machines for Wind Energy Prediction in Smart Grids", Environmental Informatics and Renewable Energies, 2013, Shaker Verlag, Aachen, ISBN: 978-3-8440-1676-5.
Alex J. Smola, et al., "A tutorial on support vector regression", Statistics and Computing 14: 199-222, 2004.
Yusuf S. Turkan, et al., "Support Vector Machine Technique for Wind Speed Prediction", International Proceedings of chemical, Biological and Environmental Engineering, 2016, vol. 93.
Extended European Search Report received in corresponding European Application No. 18160744.1 dated Sep. 26, 2018.
Buhan, S. et al., "Multistage Wind-Electric Power Forecast by Using a Combination of Advanced Statistical Methods", IEEE Transactions on Industrial Informatics, Oct. 2015, pp. 1231-1242, vol. 11, No. 5.

ADAPTIVE POWER GENERATION MANAGEMENT

BACKGROUND

A wind farm may include a plurality of wind turbines spread over a specified geographic region, which may be located on land or offshore. Wind turbines convert wind energy to electricity for distribution, such as through a power grid. Wind turbines are manufactured in a wide range of vertical and horizontal axis types. Conventional horizontal axis turbines typically include a rotor component that include blades for converting wind energy to low speed rotational energy; a generator component, which may include control electronics; and a structural support component, which may include a tower and rotor yaw mechanism.

The power produced by a wind farm may vary on any given day based on the wind speed and constancy. Furthermore, the efficiency of wind turbines can decrease over time due to wear, aging of components, and so forth. Accordingly, determining the amount of power expected to be produced on any given day, and controlling the wind turbines accordingly, can be challenging.

SUMMARY

Some implementations include arrangements and techniques for predicting a power output for a plurality of wind turbines. For example, a system may receive, for a first time period, first sensor data from respective wind turbines of a plurality of wind turbines. The first sensor data may include at least a power output and a wind speed per time interval, and the first time period may include a plurality of the time intervals. The system may train at least one respective model for each respective wind turbine based at least partially on the first sensor data received from the respective wind turbine. The system may receive, for a second time period, respective second sensor data from the respective wind turbines. Further, the system may execute, using the respective second sensor data received from the respective wind turbines, the respective model that was trained using the first sensor data received from that respective wind turbine to determine, for each respective wind turbine, a predicted power output for an upcoming time period.

The system may aggregate the predicted power outputs to determine a total predicted power output for the plurality of wind turbines. Based at least in part on the total predicted power output, the system may send a communication to cause a shut down or a start up at least one wind turbine of the plurality of wind turbines. Additionally, or alternatively, based at least in part on the total predicted power output, the system may send a communication to cause activation of a switch to divert at least a portion of produced power to or from a power storage. Additionally, or alternatively, based at least in part on the total predicted power output, the system may send a communication to a utility computing device indicating an expected power output for a least a portion of the upcoming time period.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
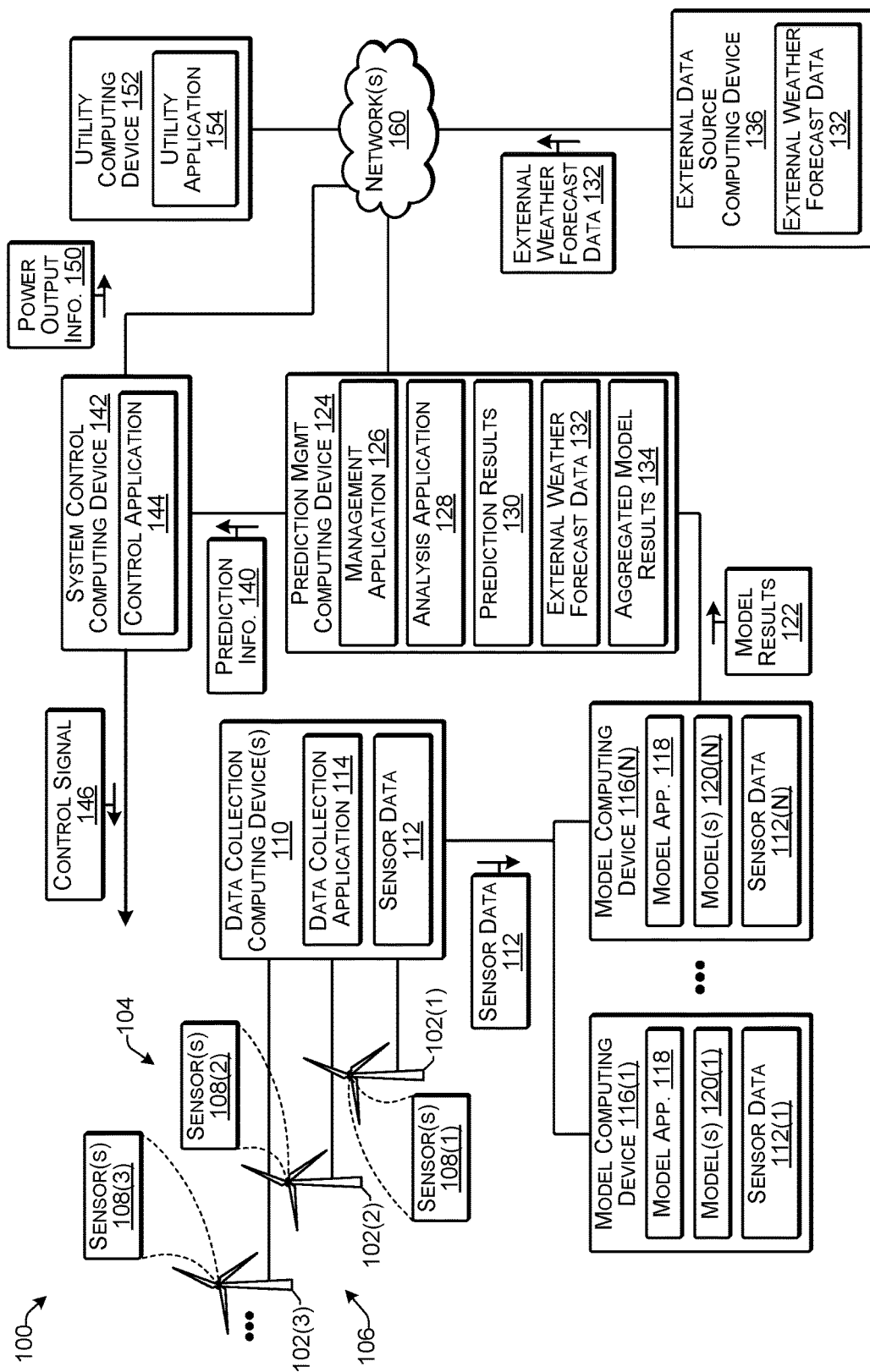
FIG. 1 illustrates an example architecture of a system that may be controlled based on a predicted power output according to some implementations.

Some implementations herein are directed to techniques and arrangements for predicting an amount of power output that is likely to be generated by one or more wind turbines in one or more upcoming time periods, and performing at least one action for controlling the system based on the predicted power output. For example, a computing device may be configured to determine a predicted power output that will be generated by each of the wind turbines, respectively, for an upcoming time period. In some cases, the predicted power output may be determined for each wind turbine in a wind farm including a plurality of wind turbines located in a specific geographic region. The power output prediction may automatically account for any idiosyncrasies of the respective individual wind turbines. For example, the predicted power output may be determined accurately regardless of whether some wind turbines in the plurality of wind turbines are from different manufacturers, are different models, have different operational characteristics, different turbine operational states, different hysteresis algorithms, different ages, and/or different installation locations and altitudes.

Some implementations herein may use sensor data obtained from each wind turbine, such as the current and recently measured power output, corresponding measured wind speed data, and other sensor information that is obtained from sensors that are installed at the respective wind turbines. As one example, the system herein may provide a one-day-ahead power output forecast for a wind farm or other comparable short-term forecast horizons. For instance, implementations herein may provide an efficient power output prediction method that can learn and execute a large number of models efficiently (e.g., 96 models to cover one-day-ahead prediction per wind turbine, customized to individual wind turbines in the wind farm).

As mentioned above, a wind farm may consist of a number of wind turbines spread over a particular geographical region. Data may be collected in real-time from sensors attached to each wind turbine, such as measured power output, measured wind speed and direction, measured yaw (the direction toward which the wind turbine is facing), air temperature, air pressure, and other data points. Some examples herein may use a Supervisory Control and Data Acquisition (SCADA) system for collecting sensor data from each individual wind turbine in the wind farm. For example a data collection computing device may receive, from the sensors at each wind turbine, rotor velocity, azimuth angle, yaw angle, and as many as 2000 or more other data points, including the wind speed and power generation output. Furthermore, while the SCADA system is described herein as one example of collecting data from the sensors at each of the wind turbines, various other techniques for collecting sensor data will be apparent to those of skill in the art having the benefit of the disclosure herein.

According to some examples herein, the power generation prediction programs and models may be deployed on a plurality of computing devices with limited computing resources, and may be deployed locally to the wind farm (i.e., at the geographic region of the wind farm) to provide day-ahead power output prediction in real-time, e.g., as the current sensor data is received from the wind turbines. For example, the power generation prediction system herein may be deployable from scratch with reasonable lead times (e.g., several weeks to one month) without requiring months or years for collecting data for analysis before the system can be made operational. Further, for maximizing prediction accuracy, the power generation prediction system herein is able easily integrate external data from additional sources as inputs to the power output prediction models. For instance, the power output prediction models herein may use a combination of external weather forecasts obtained from an external source and sensor data obtained directly from the respective wind turbines. For example, the power output prediction models can take into account a difference between the measured yaw and wind speed measured for each wind turbine and an externally obtained weather forecast that indicates a predicted wind direction and wind speed for the geographic region.

Furthermore, power output (Power P) may be related to wind speed (WS) cubed (e.g., P is a function of $WS^3$). Due to this relationship, an error in predicted wind speed may result in a significant error in the predicted power output P. Accordingly, the examples herein use direct power forecasting, rather than relying primarily on predicted wind speed for predicting power output. Further, in the system herein, each individual wind turbine may have its own respective models generated for it. For example, the system may include one or two model computing devices assigned to each wind turbine for executing a plurality of models per wind turbine in real time as sensor data is received from each wind turbine. As one example, each model computing device may be a RASPBERRY PI® computing device, or other inexpensive computing device having sufficient processing power to execute the models herein.

Further, the model computing devices may be deployed at or within proximity to the geographic region of the wind farm. As one example, being proximate to the wind farm may include being able to communicate with the wind turbines and/or the data collection computing device over a local area network (LAN), as opposed to having to communicate over a wide area network (WAN), such as the Internet. This proximate location of the model computing devices at the geographic region of the wind farm results in the system receiving the sensor data sooner and closer in time to a timestamp that may be associated with the sensor data. Further, the system is less susceptible to network latency and communication outages. Consequently, the proximate location of the model computing devices correlates to providing more accurate prediction results and also provides higher security than if the model computing devices were located in the cloud or other remote network location.

In some examples herein, the power output prediction system employs support vector machine (SVM) regression as a machine learning technique for predicting the power output for the wind turbines. SVM regression has been determined by the inventors herein to provide highly predictive accuracy, as well as efficient model construction and execution. These features of SVM regression enable the prediction modeling and analytics herein to be executed on inexpensive edge computing devices with limited computational resources. SVM regression is also able to easily accommodate large numbers of predictors with minimal chance of overfitting due to its built-in regularization mechanism for handling high dimensional model inputs.

In some examples herein, the power output prediction models may use several basic predictors including past power output and corresponding wind speed measurements averaged over a plurality of time intervals for a past time period. Other predictors may also be included for improving the accuracy of the power output prediction, such as sensor data from neighboring wind turbines, as well as external weather forecast data received from external sources, such as predicted wind speed and wind direction for the geographic region received from a weather forecasting web server, or the like.

In addition, some implementations may determine a time of day as an additional predictor for day-ahead prediction horizons. Examples of this day-to-day seasonality factor may include AM vs. PM, or a more fine-grained discretization of time such as based on the 96 15-min time intervals mentioned above. Furthermore, in some examples herein, the system may continually generate new models by using the recently received sensor data as training data for the new models. The new models may serve as standby models that may be continually evaluated and compared with the currently deployed model. If the evaluation shows that the one of the standby models consistently performs better than the currently deployed model (e.g., a threshold number of evaluation times), the most accurate one of the standby models may be activated dynamically to serve as the deployed model. Accordingly, the system herein is able to automatically adapt to changing weather conditions and changing seasons.

To predict future power output, some implementations use past and current turbine-generated power output, corresponding wind data, and time of day. For example, the predicted power output may be predicted by the models based on recent power output, recent wind conditions, and time of day. Further, each model may be trained using recently received data, e.g., from over the past week or two, past month, or the like. Thus, instead of using a static historical database of past weather patterns, some implementations herein retrain the model periodically to generate a new model as a way to account for dynamic weather patterns and changing equipment states. Accordingly, each model may be turbine-specific based at least in part on the sensor data received from that individual wind turbine. Thus, the models may automatically account for every factor that may impact power generation of a specific wind turbine, such as degraded performance due to equipment aging, wear, and tear, blade angles; flap settings; and turbine orientation, location, and adjustments that may be turbine-dependent. Examples herein do not require a large training data set, which takes time to collect. Instead, some implementations retrain the models periodically based on recently received data (e.g., received over that past week, two week, or up to the past month) to reflect dynamic changes in the weather conditions and the wind turbine itself.

After the power output is predicted, the predicted power outputs for all of the wind turbines may be aggregated (e.g., added together) to provide a power output prediction for the entire plurality of wind turbines (e.g., for the entire wind farm or a portion thereof). As one example, the power output may be predicted for each 15-minute period over the next day, i.e., 96 power output predictions for the each of 96 upcoming 15 minute periods representing the next 24 hours. Furthermore, while certain time periods are described in the examples herein for discussion purposes, (e.g., 96 15-minute prediction periods for a total of one day's worth of predictions), numerous other time periods that may be used will be apparent to those of skill in art having the benefit of the disclosure herein. Accordingly, implementations herein are not limited to any particular time periods for prediction of power output. Further, the sensor data to use as training data may be collected more frequently than the prediction time periods, e.g., data may be collected every 10 seconds, i.e., 90 samples per 15-minute period per wind turbine, or more or less frequently.

In some examples, based on the predicted power output for the upcoming time period, the system may perform one or more control functions to control the system and or the wind turbines. For example, if the power output is predicted to be very low, e.g., so low that the wind turbine is unable to produce at least a threshold level of power, the system may send a signal to cause the wind turbine to be shut down since the wind turbine will not break even on power output vs. power required to operate the wind turbine. For instance, the wind turbine may be shut down to perform routine maintenance or inspection.

As another example, if the power output is predicted to be high today, but low the following day, the system may divert some of the produced power to a power storage facility that may include a plurality of batteries for storing the power. Additionally, in some examples, the system may send predicted power output information to a utility entity computing device, e.g., to inform the utility computing device regarding the amount of power predicted to be generated by the wind farm during an upcoming time period. Further, if power output is less than an amount that was previously committed to be provided to the power grid, a control signal may be sent to a switch to cause power to be sent from the power storage facility to the grid. Thus, if the predicted power output turns out to not be correct, the stored power may be used to compensate for a difference between an amount of power committed to being provided for the current period and the actual power output for the current period.

In some examples, an application programming interface (API) may be used to send the predicted power information on a periodic basis to a control computing device that may control the wind farm system based on the predicted power output information. In other examples, other electronic communication techniques may be used for communicating the predicted power output information. Accordingly, implementations herein provide a novel, inventive, and non-conventional technique for controlling a wind farm system and individual wind turbines in the wind farm system, as well as for controlling and managing the power output by the wind farm system, thereby providing an improvement in the operation of the wind farm system itself.

For discussion purposes, some example implementations are described in the environment of one or more computing devices that receive sensor data from wind turbines, and apply the sensor data to a computational model to provide a predicted power output, such as for controlling certain wind turbines, controlling switches or other devices, or for sending information to another computing device. However, implementations herein are not limited to the particular examples provided, and may be extended to other types of data inputs, other types of environments, other system architectures, other types of computational models, other types of output, and so forth, as will be apparent to those of skill in the art in light of the disclosure herein. For instance, while some examples are described in the environment of managing wind turbines, implementations herein are not limited to this environment, and may be extended to other environments in which power is generated based on natural power sources, or the like, such as solar power, hydropower, or hybrid combinations of wind, solar and/or hydropower.

FIG. 1 illustrates an example architecture of a system 100 able to control a wind turbine power generating system and/or provide information regarding predicted power output according to some implementations. In this example, a plurality of wind turbines 102(1), 102(2), 103(3), . . . , may be located at a geographic region 104 as a wind farm or portion of a wind farm 106. Each wind turbine 102(1), 102(2), 102(3), . . . , may include a plurality of respective sensors 108(1), 108(2), 108(3), . . . , for detecting current conditions and other information from each of the wind turbines 102 in real time.

One or more data collection computing devices 110 may be located at or proximate to the geographic region 104 for receiving sensor data 112 from the sensors 108. In some cases, the sensor data 112 is timestamped and identified according to respective wind turbines 102 at the respective sensors 108, while in other cases, this may take place at the data collection computing device 110. Further, the data collection computing device 110 may include a data collection application 114 that receives the sensor data 112 from the sensors 108 and stores the sensor data 112 according to the respective wind turbine 102 from which the respective sensor data 112 was received.

A plurality of model computing devices 116(1)-116(N) may periodically receive the sensor data 112 from the data collection computing device 110. For example, there may be one or more model computing devices 116 per wind turbine 102 in the plurality of wind turbines in the wind farm 106. Each model computing device 116 may include a model application 118, one or more models 120, and received sensor data 112 for at least one of the wind turbines 102. For instance, each model computing device 116 may be designated for computing the predicted power output for a particular one of the wind turbines 102. Accordingly, if the wind farm includes, e.g., 50 wind turbines, there may be 50 respective model computing devices 116, one assigned to each wind turbine in the wind farm 106. However, in other examples, there may be more or fewer model computing devices.

As one example, suppose the first model computing device 116(1) is assigned to determining the predicted power output for the first wind turbine 102(1). Accordingly, the first model computing device 116(1) receives the sensor data 112(1) obtained from the first sensors 108(1) of the first wind turbine 102(1). The first model computing device 116(1) may train and apply one or more models 120(1) using the sensor data 112(1) received from the first wind turbine 102(1) for computing the predicted power output for the first wind turbine 102(1). In some cases, each model computing device 116 may be assigned to computing the predicted power output for a different one of the wind turbines 102 in the wind farm 106. Furthermore, in some examples, as discussed additionally below, the model computing devices 116 may receive additional sensor data 112 obtained from one or more helper turbines 102 that are located near to the particular turbine to which the model computing device 116 is assigned. For example, as discussed below, the model 120 for a particular target turbine may take into account sensor information obtained from nearby turbines (e.g., within a threshold distance) when computing the predicted power output for the particular target turbine.

Based on the received sensor data 112, each model computing device 116 may output model results 122 that are sent to a prediction management computing device 124. The prediction management computing device 124 may include a management application 126, an analysis application 128, prediction results 130, external weather forecast data 132, and aggregated model results 134. For example, the management application 126 may manage and may provide information to the model computing devices 116, as well as receiving the model results 122 from the model computing devices 116. As one example, the management application 126 may receive the external weather forecast data 132 from an external data source computing device 136. For instance, the external data source computing device 136 may be a web server or the like that provides the external weather forecast data 132 to the prediction management computing device 124, which in turn may provide the external weather forecast data 132 to the model computing devices 116. The external weather forecast data 132 may include a weather forecast for the geographic region 104 in which the wind farm 106 is located.

In addition, the analysis application 128 may receive the model results 122 from each of the model computing devices 116 and may generate aggregated model results 134 based on the model results 122. As one example, the analysis application 128 may add together or otherwise combine the model results for each time period to produce power output prediction results 130 for each upcoming time period. As discussed additionally below, the model applications 118 may be configured to produce a power output prediction result for a plurality of upcoming time periods. As one example, the models 120 may produce model results for 96 time periods of 15 minutes each for an upcoming day, and the model results 122 may be re-calculated and sent to the prediction management computing device 124 every 90 minutes for an upcoming 24 hour period. As mentioned above, the time period examples set forth herein are for discussion purposes only, and numerous other time period variations will be apparent to those of skill in the art having the benefit of the disclosure herein.

Following a determination of the latest prediction results 130, the management application 126 may send prediction information 140 to a system control computing device 142. The system control computing device 142 may include a control application 144 able to control one or more functions of the wind farm 106 and a power storage facility (not shown in FIG. 1). In some examples, the management application 126 may send the prediction information 140 to the control application 144 according to an API (not shown in FIG. 1) or via other intra-application communication techniques. Alternatively, any other electronic information communication techniques may be used to deliver the prediction information 140 to the system control computing device 142.

As discussed additionally below with respect to FIG. 2, the control application 144, upon receiving the prediction information 140, may send one or more control signals 146 to the wind farm 106 or to other systems associated with the wind farm 106. For instance, the control signal 146 may be a communication to control an individual wind turbine 102 or may control multiple wind turbines 102, such as for powering up or shutting down the wind turbines, preparing the wind turbines for maintenance, or the like. As another example, the control signal 146 may be a communication to control one or more switches (not shown in FIG. 1) such as for diverting some or all of the surplus power generated by the wind farm 106 to a power storage facility, as discussed additionally below with respect to FIG. 2. Additionally, or alternatively, the control application 144 may send power output information 150 in a communication to a utility computing device 152 that includes a utility application 154, and which may be associated with a utility entity that at least partially controls a power grid (not shown in FIG. 1) that receives the power produced by the wind farm 106. Additionally, as discussed below with respect to FIG. 2, the control application 144 may send a control signal 146 to cause the power storage to discharge a portion of the batteries to the grid, such as to compensate for a deficit in meeting a power output commitment.

The system control computing device 142 and/or the prediction management computing device 124 may be able to communicate with the external data source computing device 136, the utility computing device 152, and/or each other over one or more networks 160. The one or more networks 160 may include any type of network, including a local area network (LAN), such as an intranet; a wide area network (WAN), such as the Internet; a wireless network, such as a cellular network, a local wireless network, such as Wi-Fi, and/or short-range wireless communications, such as BLUETOOTH®; a wired network including fiber optics, Ethernet, Fibre Channel, or any other such network, a direct wired connection, or any combination thereof. Accordingly, the one or more networks 160 may include both wired and/or wireless communication technologies. Components used for such communications can depend at least in part upon the type of network, the environment selected, or both. Protocols for communicating over such networks are well known and will not be discussed herein in detail.

Furthermore, in some examples, the model computing devices 116 may communicate with the prediction management computing device 124 over the one or more networks 160, while in other examples, the prediction management computing device 124 may be co-located with the model computing devices 116 proximate to the geographic region 104 of the wind farm 106. Similarly, the system control computing device 142 may be located proximate to the geographic region 104 of the wind farm 106, and may be co-located with the data collection computing device 110 and/or the model computing devices 116 and/or the prediction management computing device 124. As still another alternative, the data collection computing device 110 may be located proximate to the geographic region 104 of the wind farm 106, while the model computing devices 116 and/or the prediction management computing device 124 and/or the system control computing device 142 may be remotely located over the one or more networks 160 such as in the cloud or other suitable network location. Numerous other networking configurations will be apparent to those of skill in the art having the benefit of the disclosure herein.

Additionally, in some examples, the functions of the model computing devices 116 and the prediction management computing device 124 may be combined into one or more computing devices in any desired manner. Furthermore, in some examples, the functions of the management computing device 124 and the system control computing device 142 may be combined into one or more computing devices in any desired manner. Furthermore, in some examples, the functions of the data collection computing device 110, the model computing devices 116, the prediction management computing device 124, and the system control computing device 142 may be combined into one or more computing devices in any desired manner. Numerous other variations will be apparent to those of skill in the art having the benefit of the disclosure herein.

Figure 2:
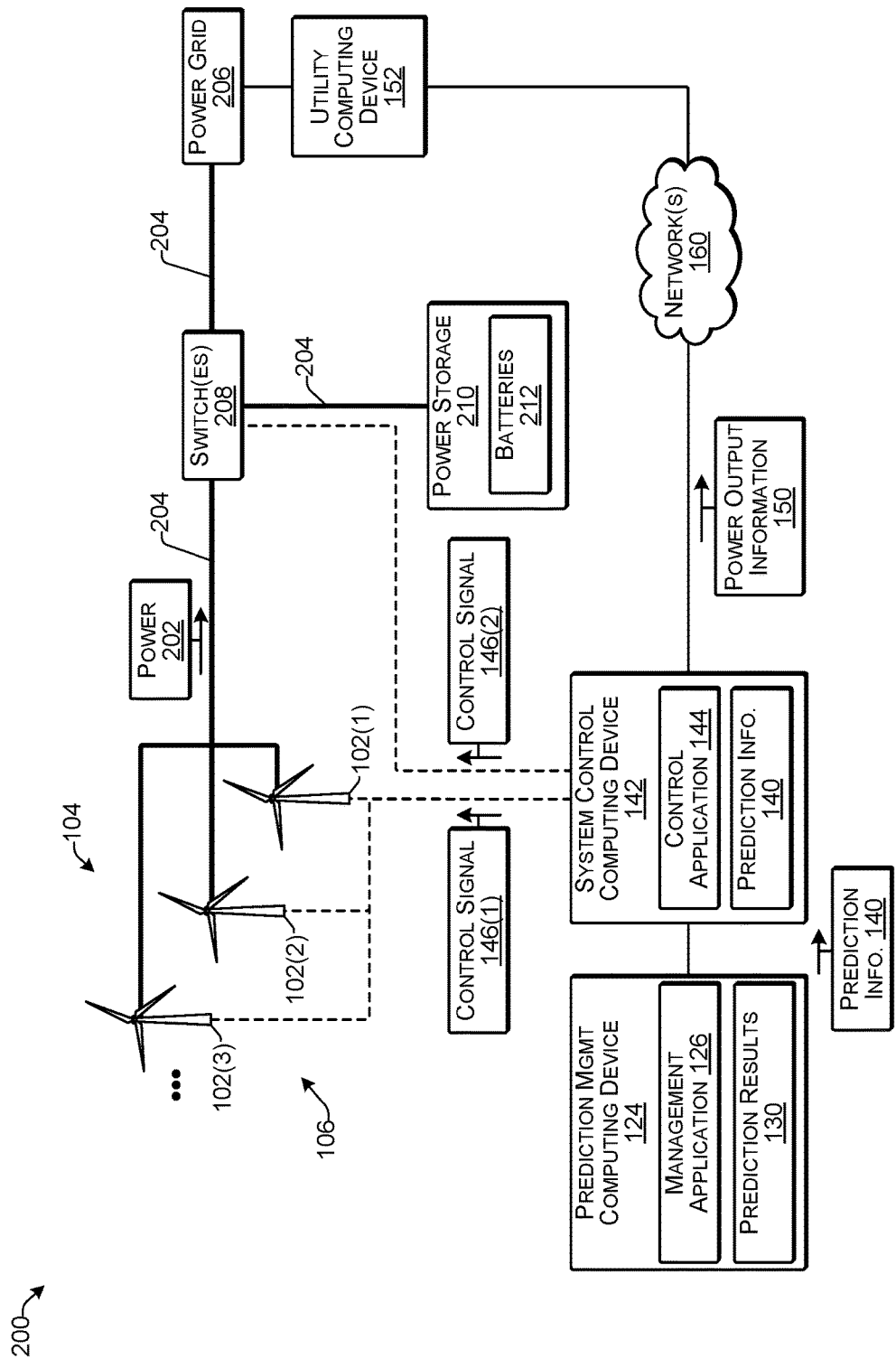
FIG. 2 illustrates an example architecture of a system that may be controlled based on a predicted power output according to some implementations.

FIG. 2 illustrates an example architecture of a wind power system 200 according to some implementations. The wind power system 200 may correspond to the system 100 discussed above with respect to FIG. 1. The wind farm 106 may produce electric power 202 and may deliver the electric power 202 along one or more power lines 204 to an electric power grid 206. The power grid 206 may be controlled at least partially by a utility entity associated with the utility computing device 152. The one or more power lines 204 may include one or more switches 208 that may be operable to deliver some or all of the power 202 to a power storage 210. For example, the power storage 210 may include one or more batteries 212 or other power storage devices able to receive and store the electric power 202 when the electric power 202 is delivered to the power storage 210. In some cases, the batteries 212 may be discharged to the power grid 206, such as to compensate for a deficit in meeting a desired or intended power output to the power grid 206.

As mentioned above, the prediction management computing device 124 may deliver the prediction information 140 to the system control computing device 142. The control application 144 on the system control computing device 142 may determine one or more actions to perform based on the prediction information 140. As one example, suppose that the prediction information indicates the wind is predicted to be very low during the upcoming day. For instance, wind turbines typically require at least some electric power to operate, and in cases in which the wind is below a breakeven threshold wind speed, the wind turbines cannot produce enough electricity to offset the cost of operation. In such a case, the control application 144 may send a signal to cause the wind turbine to be shut down since the wind turbine will not break even on power output vs. operating cost to operate the wind turbine.

Similarly, some wind turbines may be shut down when the wind speed exceeds a certain threshold. For example, having an upper wind speed threshold cut-out speed is a safety feature that protects the wind turbine from damage. Further, high wind speed shutdown events may cause significant fatigue loading. Accordingly, if high winds are predicted that will exceed the threshold for shut down (i.e., exceed the cut-out speed), the wind turbines may be shut down in advance of the high winds to prevent repeated start up and shut down of the wind turbines when the wind speed exceeds the shutdown threshold.

Typically, such shutdowns to due to extremely low wind or extremely high wind are relatively rare for most wind farms. A more common example is that the power output is predicted to be high enough to operate the wind turbines, but not so high that the wind turbines are operating close to maximum efficiency. Accordingly, the prediction information 140 herein may be used by the control application 144 to determine actions to take in such situations.

As one example, a wind farm may experience reduced power output when the wind turbines are taken down for preventive maintenance and repairs. Accordingly, implementations herein may enable the control application 144 to select a downtime that has the least impact on overall power output. If the wind turbines will be shut down due to low wind, this may be a good time to perform maintenance. However, as such shutdowns may rarely occur, the control application 144 may select a time to perform maintenance based on the predicted power output for an individual wind turbine over an upcoming period. For instance, if the predicted power output is high enough to operate the wind turbines, but is still below a first power output threshold, the control application may determine to take one or more of the wind turbines 102 offline for routine maintenance during the upcoming time period. Based on the prediction information 140, the control application 144 may determine that the loss of power production due to the maintenance during the upcoming time period may be minimal as compared to what the loss of power production may be at other times when the power output would be higher. As one example, the first power output threshold may be at or below the average past power output for the particular wind turbine 102. Accordingly, when the control application 144 selects a particular one of the turbines 102 to take offline for maintenance, the control application 144 may send a first control signal 146(1) to the particular wind turbine 102 to shut down the particular wind turbine 102.

As another example, if the total power output of the wind farm is expected to be high during a first upcoming time period, but low during a following second upcoming time period, the control application 144 may determine to divert at least some of the produced power 202 to the power storage 210, so that the stored power may be delivered to the power grid 206 during the following second time period when the power output of the wind turbines 102 is predicted to be low. To accomplish this, the control application 144 may send a second control signal 146(2) to the one or more switches 208 to cause the one or more switches 208 to divert at least some of the power 202 to the power storage 210. In addition, if the actual power output of the wind farm is less than an amount committed to be delivered to the power grid 206, e.g., due to an earlier incorrect power output predication, the control application 144 may send the control signal 146(2) to the switches 208 to cause the power storage 210 to discharge a portion of the batteries 212 to the power grid 206. For example, the stored power may be provided to the power grid 206 to compensate for the difference between the actual power output of the wind farm and a power output commitment which may have been provided to the utility computing device 152 based on the predicted power output.

Additionally, as another example, the control application 144 may send power output information 150 to the utility computing device 152. For example, based on the prediction information 140, the control application may determine an amount of power output that may be delivered to the power grid 206 over the upcoming time period. Based on this determination, the control application may send the power output information 150 to the utility computing device 152 which may then perform other actions based on the received power output information 150 such as for preparing the power grid 206 to receive the anticipated power output and or making arrangements to obtain power output from other sources if the predicted power output is expected to be below a threshold level.

Figure 3:
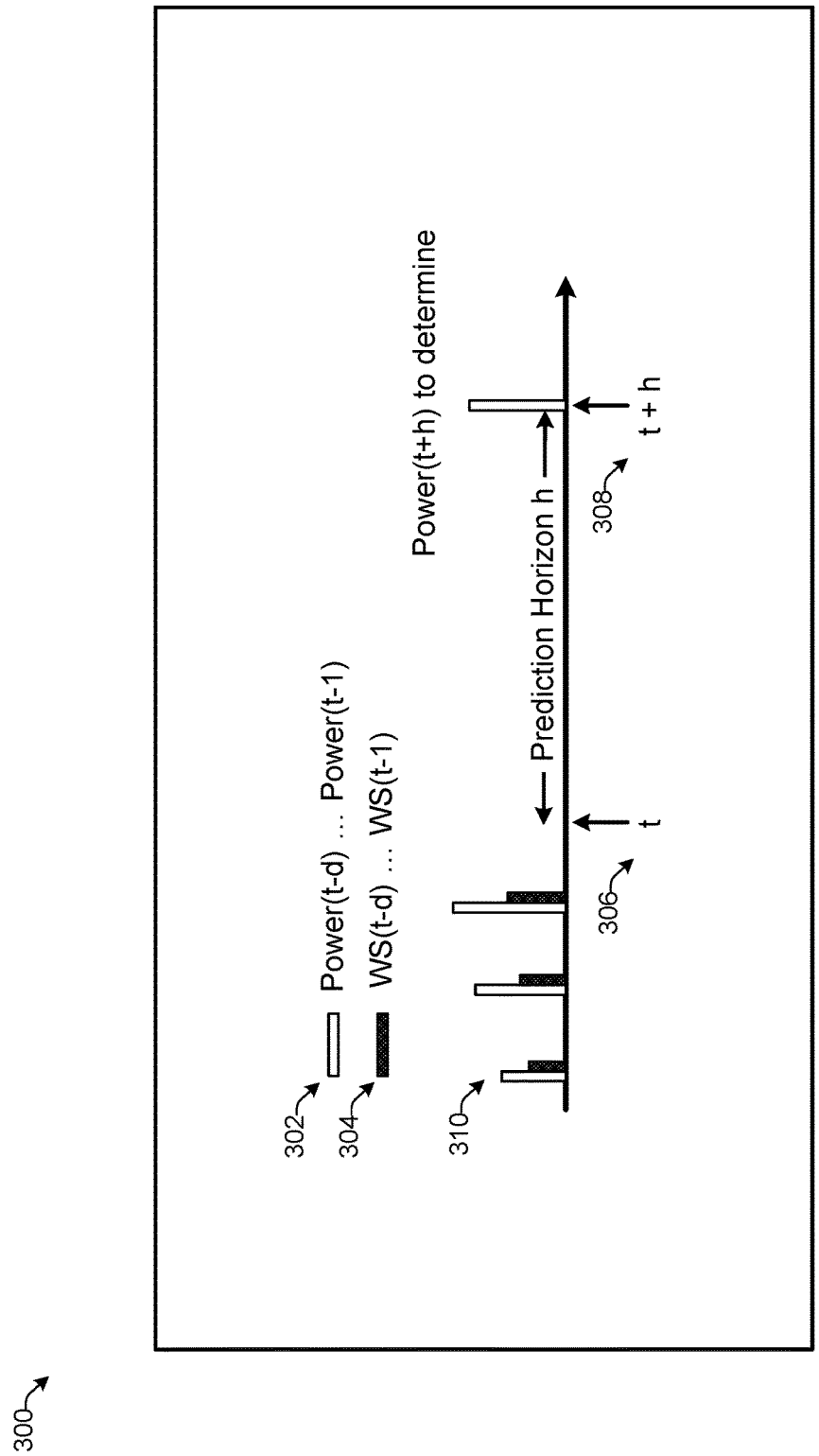
FIG. 3 illustrates an example of a prediction horizon for predicting a power output according to some implementations.

FIG. 3 illustrates an example graph 300 including a prediction horizon for predicting an amount of power output according to some implementations. For example, unlike traditional approaches which aim to forecast wind speeds, which are then fed to a turbine-manufacturer-provided power curve, implementations herein may model power output directly based at least partially on recently received sensor data received from the wind turbines. Accordingly, the examples herein minimize power output prediction inaccuracies that may result from errors in the forecasting of wind speeds. As mentioned above, power output for a wind turbine may be generalized to be a function of wind speed cubed ($WS^3$). Accordingly, an incorrect predicted wind speed may significantly skew a predicted power output. Furthermore, the power curves provided by turbine manufacturers may be based on theoretical and/or nominal models that may not account for variabilities in operational characteristics of individual turbines such as age of the turbines, turbine specific hysteresis algorithms, the location and altitude of the turbines and so forth. In addition, wind farm owners may often operate turbines from more than one manufacturer and or with different models of turbines. Accordingly, implementations herein are not dependent on the availability of manufacturer power curves and are able to provide a prediction for power output for individual wind turbines that is independent of different manufacturers, different models, different locations, different altitudes, and the like.

The examples herein may provide at least one day ahead power forecasting for a wind farm and may employ a large number of models that are built, deployed, and refreshed frequently. As one example, the model computing devices may provide a forecast for every 15 minute time interval over an upcoming time period, such as the next 24 hours, and therefore may use 96 models for each wind turbine in the wind farm. For a typical wind farm this may mean that thousands of models are built, trained, and deployed.

The examples herein may use multiple time series as basic predictors for predicting the power output of individual turbines. For example, to directly predict power output for an upcoming time period, the model computing devices herein may use power and wind speed measurements that have been observed in the recent past (e.g., the past 30 minutes to one hour). The recent power output of a wind turbine and the recently measured wind speed as measured by sensors at the wind turbine may be collected over a short time window, such as the last 30 minutes or so prior to a present time, to provide a time series that may be used by a model as a predictor (i.e., an input to the model).

The sensor data may be collected at a substantially higher rate than that used by the power output prediction models herein. As one non-limiting example, the sensors at the wind turbines may take data samples at a rate of 6 samples per minute, e.g., once every 10 seconds. However, implementations herein may only forecast the predicted power output averaged over a 15 minute period, e.g., based on data samples averaged over 5 minute intervals. Accordingly, the raw sensor data may be aggregated (e.g., by averaging over a time interval) to the corresponding granularity level used by the models. Furthermore, the time intervals over which the data is to be aggregated may be anchored at any point in time. In other words, while the time intervals for which the predicted power output is provided are consecutive and therefore do not overlap, the aggregated sensor data used as the input by the models does not necessarily have to be disjoint, and may instead overlap.

As illustrated in FIG. 3, the graph 300 includes a plurality of white bars 302 that are indicative of power and a plurality of black bars 304 that are indicative of wind speed (WS). Furthermore, the current time t is indicated at 306, and a time for which to predict a power output is represented at 308 by the time t plus the prediction horizon h. The measured power output and corresponding measured wind speed is represented at 310 for a plurality of past time intervals t-1, t-2, . . . , t-d, where d is the limit as to how far back in time the input to the model goes. As discussed below, in some examples, d may be 4 corresponding to four 15-minute time intervals. Additionally, or alternatively, d may be a function of the prediction horizon h.

In this example, suppose that a power output prediction will be provided for each upcoming 15 minute time interval. Accordingly, data that may be used as input to the prediction model may be aggregated at the same granularity level i.e., over 15 minute time intervals. As one example, the model may use four such aggregated groups of data as input. The four corresponding periods may be disjoint, in which case they may span a window of one hour. As another example, the 4 periods may overlap with anchors 5 minutes apart, in which case they may span an immediately prior window of 30 minutes. Accordingly, the 15 minute intervals do not have to be anchored at the quarters of the clock even if the forecast periods may be so anchored. To the contrary, by allowing anchors at every 5 minutes instead of every 15 minutes, implementations herein may triple the size of the training data set. Accordingly, the training set for the power output prediction model at horizon h may be expressed as a collection of tuples of the form:

$$(P(t-d), \ldots, P(t-1), WS(t-d), \ldots, WS(t-1), POD(t), P(t+h)),$$

where t can be anchored at arbitrary time points, P is power, WS is wind speed, h is the prediction horizon, and POD is period of day.

Furthermore, the models herein are able to automatically handle day-to-day seasonality patterns. For example by breaking up a day into the 96 15-minute intervals, the models may use the period of day (POD(t) above) to index the 15 minute interval into which a particular time prediction t falls. In this example, the POD(t) may be a an integer between 0 and 95 which may serve as an additional predictor for the model. For example, the period of day may have a significant impact on forecast accuracy for longer forecast time horizons, such as a half-day away from the present time.

In addition, year-to-year seasonality patterns may also be handled by the models herein. For example, implementations herein assume that data collected over multiple years is not available for training the models herein. For example since the prediction system may be new to the particular windfarm and/or the windfarm itself may be new, there may be no available data for past years that may be used as training data to account for year-to-year seasonal changes in power output. However, the models herein may handle year-to-year seasonality using a different but accurate approach. For instance, when a new windfarm is opened, the models herein are able to start forecasting in a short amount of time, e.g., a month or two. Therefore, to account for the effects of changes in the seasons, implementations herein do not require collecting multi-year turbine output data for use as the training data set. Instead, the models herein may be retrained periodically using a sliding window of historical data. Since this sliding window needs to reflect the latest pattern in weather conditions, the window for the training data cannot be very wide. At the same time, the time window for the training data may be wide enough to provide an adequately large data set for model training. Typically, one month's worth of past data has been found by the inventors herein to provide an adequate amount of training data to train an accurate model that takes a change in seasons into account.

Figure 4:
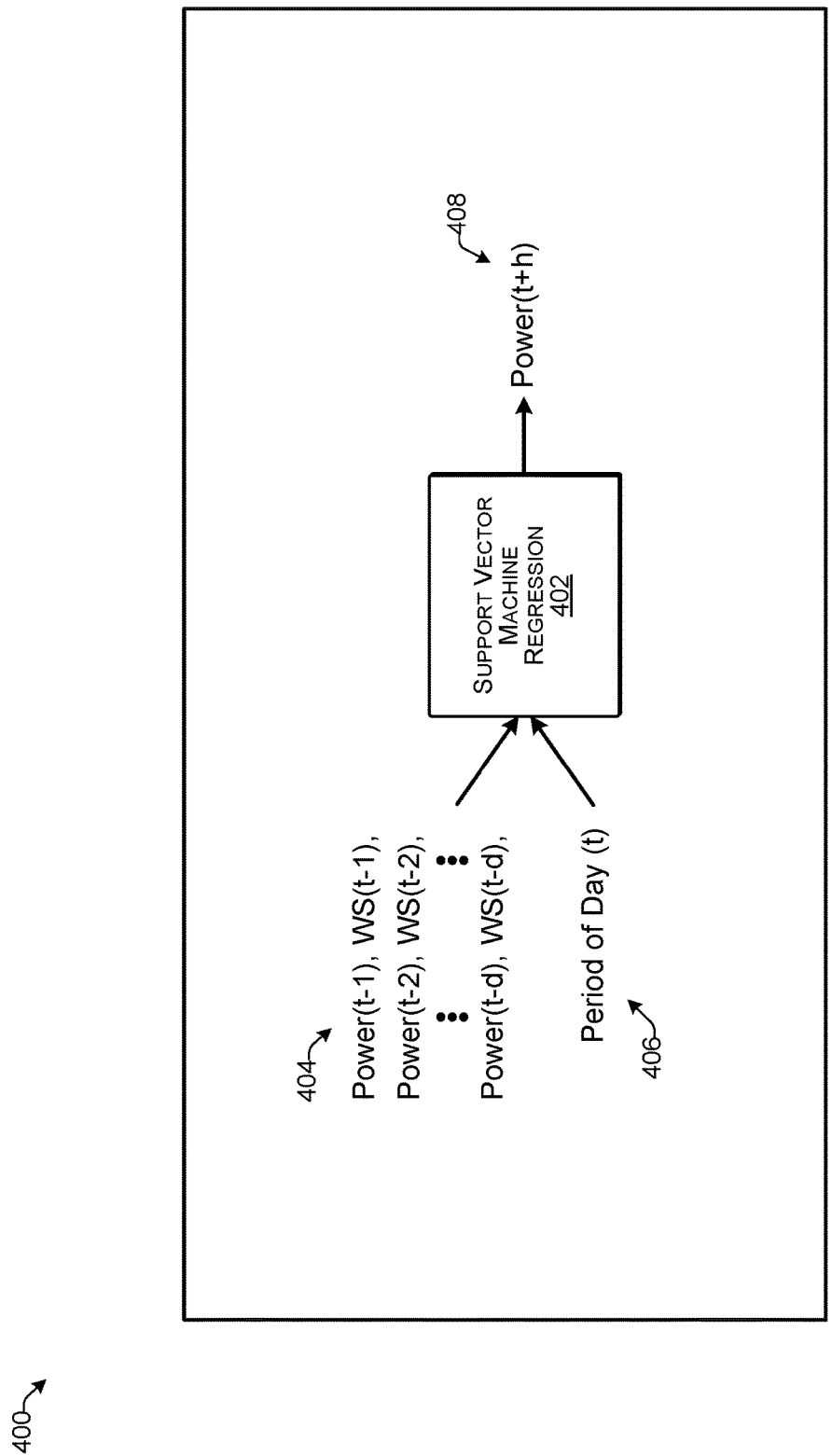
FIG. 4 illustrates an example of using support vector machine regression for predicting a power output according to some implementations.

FIG. 4 illustrates an example 400 of using support vector machine regression for predicting an amount of power output according to some implementations. As mentioned above, the examples herein may use support vector machine (SVM) regression for predicting the power output for individual wind turbines over an upcoming time period. In general, support vector machines are supervised learning models with associated learning algorithms that analyze data used for classification and regression analysis. Given a set of training examples, each marked as belonging to one or the other of two categories, an SVM training algorithm based on a linear kernel builds a model that assigns new examples to one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on the side of the gap upon which they fall.

In SVM regression (as well as classification), the model produced depends on a subset of the training data because the cost function for building the model ignores any training data close to the model prediction. in its simplest form, training an SVM regression model based on a linear kernel may include solving the following:

$$\text{minimize } \frac{1}{2} \|w\|^2$$

$$\text{subject to } \begin{cases} y_i - \langle w, x_i \rangle - b \le \varepsilon \\ \langle w, x_i \rangle + b - y_i \le \varepsilon \end{cases}$$

where $x_i$ is a training sample with target value $y_i$. The inner product plus intercept $\langle w, x_i \rangle + b$ is the prediction for that sample, and $\varepsilon$ is a free parameter that serves as a threshold: all predictions have to be within an $\varepsilon$ range of the true predictions.

Given a training set $\{(x_i, y_i)\}$, SVM regression, in its simplest form, tries to fit a hyperplane $f(x) = \langle w, x \rangle + b$ to the training data, where $<w, x>$ denotes the dot product of vectors w and x. Solving for w and b is framed as an optimization problem where, for a given $\varepsilon$:

Small w values are preferred and the objective function to minimize is $\|w\|^2$ Subject to constraints $|y_i - f(x_i)| \le \varepsilon$ for all i in the training set.

Further, it may be noted that minimizing $\|w\|^2$ is a built-in regularizor that penalizes model complexity and helps avoid overfitting, especially when the input space is high-dimensional. In addition, the fact that the objective function is quadratic (in w) has important implications. First, as a convex constrained optimization problem, the solution, if exists, is unique, unlike artificial neural networks where the objective function is typically non-convex and thus admits multiple local minima. Second, efficient quadratic programming (QP) algorithms exist to solve the problem. As formulated, the problem may not have a feasible solution for a given $\varepsilon$, so in some cases the feasibility constraints may be relaxed.

As mentioned above, for a given $\varepsilon$, a feasible solution may not always exist since there may be data points such that $f(x_i)$ is more than e away from $y_i$. So slack variables $\xi_i$ and $\xi'_i$ are introduced to relax the constraints, and the constrained optimization problem is reformulated as follows:

Minimize $\|w\|^2 + C \times \Sigma(\xi_i + \xi'_i)$

Subject to constraints:

$$\begin{cases} y_i - f(x_i) \le \varepsilon + \xi_i, & \xi_i \ge 0 \\ f(x_i) - y_i \le \varepsilon + \xi'_i, & \xi'_i \ge 0 \end{cases}$$

In addition, in some cases, using dual formulation may make the problem easier to solve. As one example, the Lagrange multipliers method may be used such that the quadratic constrained optimization problem has a dual formulation which makes it easier to solve. Using new parameters $\alpha_i$ and $\alpha'_i$, called dual variables, the dual formulation is as follows:

Maximize an objective function quadratic in $\alpha_i$ and $\alpha'_i$ (details omitted here)

Subject to Constraints:

$\Sigma(\alpha_i - \alpha'_i) = 0, 0 \le \alpha_i, \alpha'_i \le C$

Accordingly, the solution to the original problem can be rewritten in terms of the dual variables as follows:

$w = \Sigma(\alpha_i - \alpha'_i) x_i$ $f(x) = \Sigma(\alpha_i - \alpha'_i) <x_i, x> + b$ where i ranges over a subset of the original training data, called Support Vectors. Thus, the SVM regression model may be defined by the support vectors and their weights.

Additionally, in the case of a nonlinear SVM regression model, fitting a hyperplane in the original space (called input space), the input space may first be transformed to a higher-dimensional space (called feature space) using some nonlinear mapping $\Phi(x)$ with special properties, and then fit a hyperplane in that feature space. Because of the higher dimensionality, fitting a hyperplane in the feature space can produce a much better fit than in the input space. A hyperplane in the feature space induces a hypersurface (nonlinear) in the input space.

With kernel K defined as $K(x, x') = <\Phi(x), \Phi(x')>$, the optimization problem can be restated as:

Maximize a quadratic function of $\alpha_i$ and $\alpha'_i$ where any dot product $<x_i, x_j>$ found in the original formulation is replaced with $K(x_i, x_j)$ Subject to constraints:

$\Sigma(\alpha_i - \alpha'_i) = 0, 0 \le \alpha_i, \alpha'_i \le C$

Accordingly, the solution to the original problem can be rewritten as:

$w = \Sigma(\alpha_i - \alpha'_i) \Phi(x_i)$ $f(x) = \Sigma(\alpha_i - \alpha'_i) K(x_i, x) + b$ where i ranges over the set of support vectors.

When choosing a mapping $\Phi$ or kernel K that induces a high-dimensional feature space, computing directly in the high-dimensional feature space can be expensive and even impossible. However, it may not be necessary to compute w explicitly, as the required computations may involve only $<\Phi(x),\Phi(x')>$, or equivalently, $K(x,x')$, which may be computed cheaply in the input space. For example, RBF is a commonly used kernel defined as:

$$RBF(x,x')=e^{-Gamma\times\|x-x'\|^2}$$

While this may be inexpensive to compute in the input space, its induced feature space has infinite dimensions, which precludes any computation in the feature space to be done directly. In addition, while many commercially available quadratic programming tools may be readily used to solve the quadratic optimization problem herein, a large and evolving body of algorithms has been developed to leverage the special structure of the optimization problem that help compute the solution even more efficiently, as is known in the art.

The techniques described herein for applying SVM regression for predicting power output provide improved efficiency and reduce the amount of computer processing required to predict a power output for an upcoming time period. In particular, the application of the SVM regression techniques as described herein is more efficient compared with other machine learning techniques such as artificial neural networks, multilayer perceptron's, recurrent neural networks, and the like. For example, these other types of machine learning techniques may require a considerable amount of training data, considerable computational resources, may take a long time to converge, and/or may produce solutions that are only locally optimal. SVM modeling involves optimizing a quadratic and, thus, convex objective function. The solution model may be not only unique, but also may be found using efficient algorithms.

Furthermore, other traditional modeling techniques such as autoregressive integrated moving average (ARIMA) are too simplistic to forecast power output accurately. For example, ARIMA is essentially linear in nature and not powerful enough to take into account nonlinear dependencies of recent observations. Additionally, fitting ARIMA models requires an unbroken time series, which may not be available in the environments herein.

On the other hand, the SVM regression techniques described herein may include regularization built-in, are able to handle high dimensional model inputs, and support the use of a large number of predictors with minimal chances of overfitting the model. Accordingly, the SVM regression models herein may be used with low power computing devices that are inexpensive and easily deployed at or proximate to the geographic region of the wind farm itself, e.g., at the "edge" of the IoT cloud. Accordingly, the SVM regression techniques herein greatly reduce the processing required for calculating the predicted power output for a wind turbine, thereby enabling the use of a plurality of low power, inexpensive model computing devices to be deployed in field at or near to the wind farm. For example, if the wind farm includes 50 wind turbines, 50 corresponding model computing devices may be deployed, each programmed to train and apply models for an assigned one of the wind turbines in the wind farm. For example, at a price of $5-$35 per model computing device, the total cost for the model computing devices may be $250-$1750.

Because the techniques herein provide a greatly improved and efficient technique for calculating the predicted power output of a wind turbine, the model computing devices are able to continually receive new sensor data, and use the new sensor data to train new standby models for the respective wind turbines. Further, as discussed additionally below, the model computing devices are able to compare the performance of the standby models with a currently deployed model based on subsequently received actual power output data to determine which model performs the best and may subsequently use the more accurate model for performing future calculations for predicting power output. Accordingly, implementations herein provide a substantial improvement in the operation of the model computing devices themselves.

The example of FIG. 4 illustrates the power output prediction framed as an SVM machine learning regression problem that includes performing SVM regression 402 on a plurality of inputs. The inputs to the SVM regression 402 includes a time series 404 of measured power output and corresponding wind speed for a plurality of recent time periods, e.g., within the past half hour to an hour. As discussed above with respect to FIG. 3, these times may include t-1, t-2, . . . , t-d. An additional input in this example may include the period of day (POD(t)), as indicated at 406, for the current time. The output 408 of the SVM regression 402 may be a predicted power output at time t plus prediction horizon h. Furthermore, while several inputs are shown in this example, other inputs may also be provided to the SVM regression 402 such as external data, e.g., weather forecast data, wind turbine position data, such as yaw data, wind direction data, blade position data, flap position data, air temperature, and so forth.

As mentioned above, in some examples, the predictor feature resolution may be the same as the period of day prediction resolution, e.g., 15 minute intervals, and there may be 96 different models per wind turbine for predicting 96 different 15 minute intervals for a next upcoming day. Furthermore, the SVM regression model may be trained using historical data with a window size of, e.g., 1-4 weeks.

For a given power prediction model there may be two categories of factors that can affect power output prediction accuracy, the first being the parameters discussed above, such as the period of day resolution, the predictor feature resolution, the number of time points used from the input time series, the time between consecutive interval anchors, the number of models per wind turbine, and the sensor data sampling rate. A second factor that may affect the power output prediction accuracy is SVM hyperparameters. However, not all of these parameters need to be optimized every time a model is created or refreshed. To the contrary, only certain ones of these parameters provide a sizable benefit when optimized under certain circumstances. For instance, when the problem parameters are initially defined, the following features may be tuned or otherwise optimized: predictor feature resolution, period-of-day resolution, and number of models per turbine. Additionally, when the weather condition changes, the following features may be tuned or otherwise optimized: training data window size, number of time points from time series used for model inputs, and stride (i.e., time) between aggregation intervals. Furthermore, when the SVM model is built or refreshed, settings for the following hyperparameter features may be tuned or otherwise optimized: SVM regression Gamma kernel coefficient and the SVM regression C regularization coefficient. To determine optimal settings for these hyperparameter features, a grid search may be performed in which different parameter values are used to train the SVM model and test the performance of the SVM model on a separate cross-validation test dataset. The separate cross-validation test dataset may be obtained by randomly partitioning the original dataset into a first partition for training and a second partition for testing. Alternatively, an n-fold cross-validation can be used where the data set is partitioned into n contiguous time series, and testing is done on each of the n partitions for a model trained on the (n-1) remaining partitions.

Figure 5:
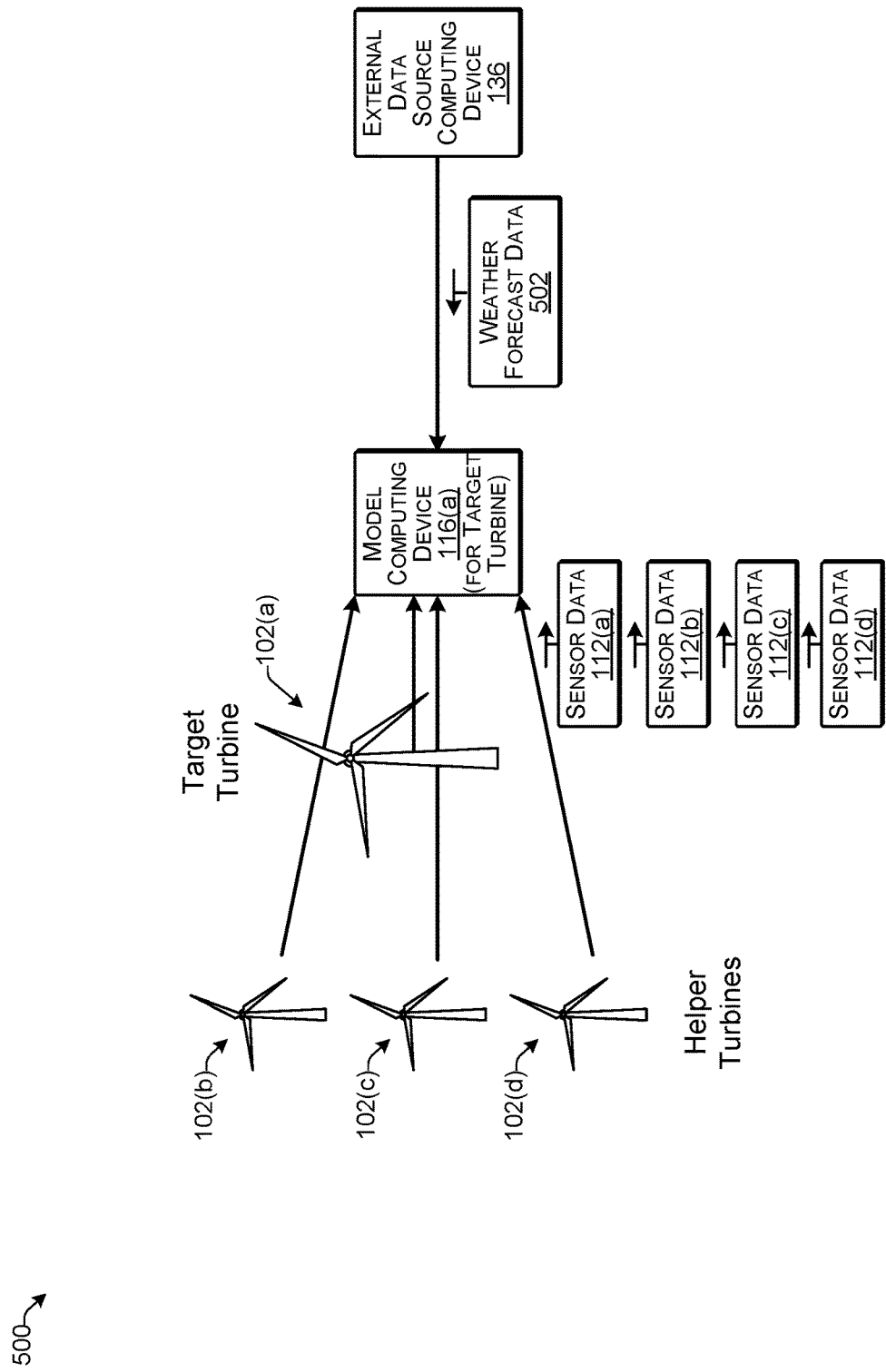
FIG. 5 illustrates an example of using helper turbine sensor data and/or external weather forecast data to predict a power output by a target wind turbine according to some implementations.

FIG. 5 illustrates an example 500 of using helper turbine sensor information to predict an amount of power to be output by a target wind turbine according to some implementations. For instance, in this example, data from one or more neighboring wind turbines (e.g., within a threshold distance from a target wind turbine 102(*a*)) may be used when determining a predicted power output for the target wind turbine 102(*a*), which may help to reduce noise and provide additional information useful to enhance the power output prediction for the target turbine 102(*a*).

In this example, sensor data 112(*a*) from the target wind turbine 102(*a*) is provided to a model computing device 116(*a*) for the target turbine 102(*a*). In addition, sensor data from one or more helper turbines may also be provided to the model computing device 116(*a*). For example, the model computing device 116(*a*) may receive sensor data 112(*b*) from a helper turbine 102(*b*), sensor data 112(*c*) from a helper turbine 102(*c*), and sensor data 112(*d*) from a helper turbine 102(*d*). In this example, the data collection computing device 110 is not shown. Alternatively, as another example, the data collection computing device 110 may be eliminated, and the model computing device 116(*a*) may receive the sensor data directly from the respective wind turbines 102.

In addition, the model computing device 116(*a*) may receive weather forecast data 502 from the external data source computing device 136. In this example, the prediction management computing device 124 is not shown. Alternatively, as another example, the prediction management computing device 124 may be eliminated and the model computing device 116(*a*) may receive the weather forecast data 502 directly from the external data source computing device 136. As one example, with or without the use of the sensor information from the helper turbines, the model computing device 116 may use the wind direction data included in the weather forecast data 502 and may compare the wind direction data with the turbine yaw position as a comparison for determining the effective wind speeds as received by the sensors at the target turbine 102(*a*).

Furthermore, power output and wind speed time series determined from the sensor data 112(*b*)-112(*d*) from neighboring helper turbines 112(*b*)-112(*d*), respectively, may be used to help reduce noises and provide additional information useful to enhance power output prediction for the target turbine 102(*a*). In addition, the external weather forecast data 502, including the wind direction and wind speed, may be compared with the sensor data from the helper turbines 102(*b*)-102(*d*) to improve the prediction accuracy for the target turbine 102(*a*).

Figure 6:
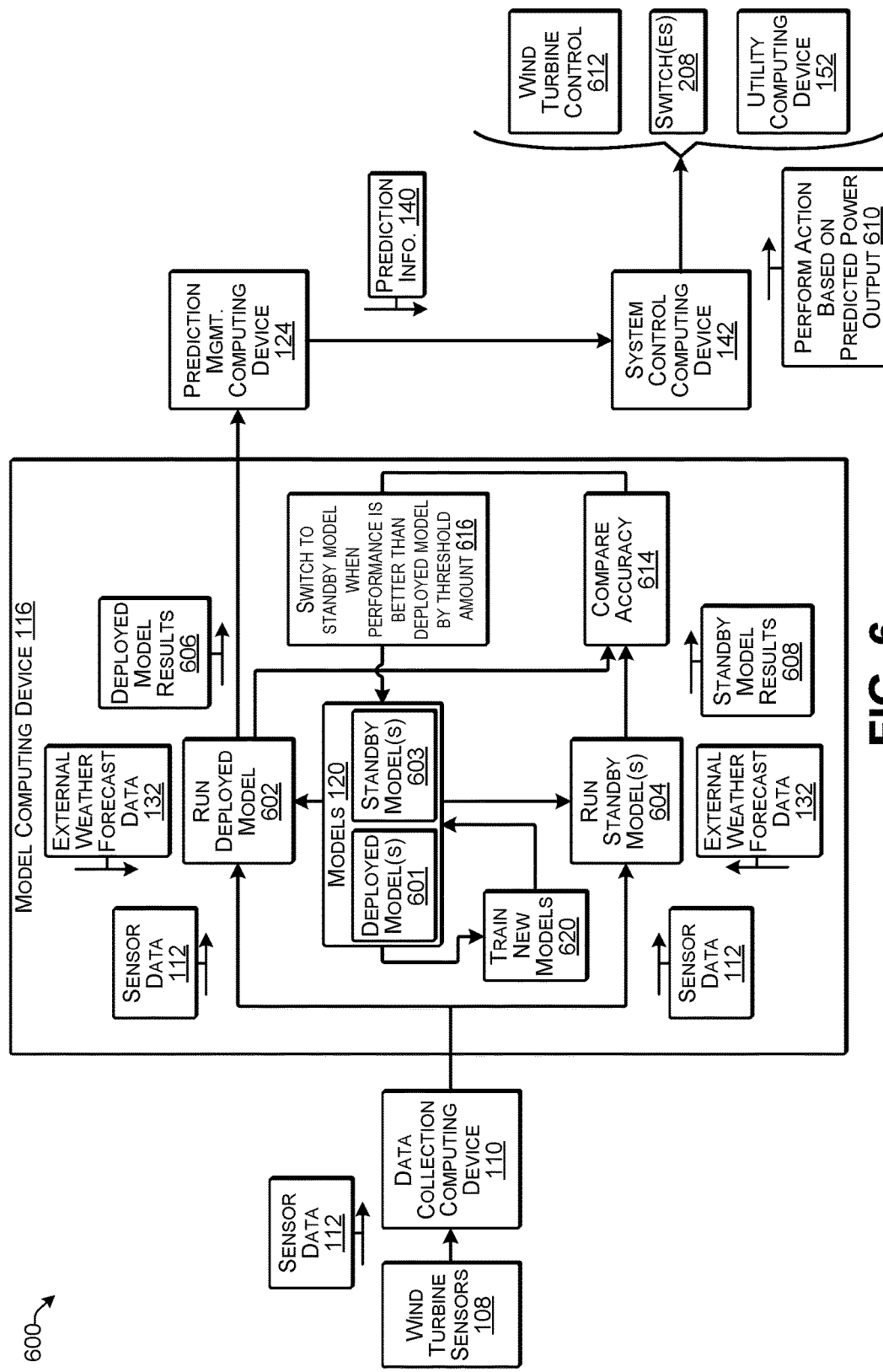
FIG. 6 illustrates an example of predicting power output using a system with a plurality of competing models according to some implementations.

FIG. 6 illustrates an example of predicting power output using a system 600 with a plurality of models, which may be executed by the model computing device 116 according to some implementations. In some examples, the system 600 may correspond to the systems 100 and 200 discussed above. For instance, the model application 118 or other applications, programs, executable instructions, or the like, (not shown in FIG. 6) may be executed on the model computing device 116 to perform the functions and algorithms described herein. The models 120 may include a plurality of competing models, including at least one deployed model 601 and at least one competing standby model 603. In some examples, the models 120 can be refreshed and the refreshed models may be deployed on a fixed periodic schedule, such as every week or two.

Alternatively, as illustrated in this example, a more dynamic and adaptive model switching strategy may be employed. For example, multiple competing models may be used for predicting power output, with one or more competing standby models 603 waiting in the wings to replace a deployed model 601 if one of the standby models 603 is shown to be more accurate. These standby models 603 may be built using different training data or even using different selected predictors. The system 600 in FIG. 6 may continually monitor and compare the prediction accuracy of the deployed model 601 and the one or more standby models 603 by comparing the actual measured power output data to the predicted power output predicted by each model 601, 603. When a standby model 603 consistently outperforms the deployed model 601 and other standby models 603, e.g., a threshold number of times, then that standby model 603 may be activated and become the deployed model 601, and the previously deployed model may become a standby model 603 or may be deleted.

In this example, the data collection computing device 110 may receive sensor data 112 from the wind turbine sensors 108. The sensor data 112 may be forwarded to the model computing device 116 for the respective wind turbine. The model computing device 116 may include the plurality of models 120 including at least one deployed model 601 and one or more standby models 603. The model computing device 116 may use the received sensor data 112 and external weather forecast data 132 to run the deployed model 601, as indicated at 602. Further, the model computing device 116 may use the received sensor data 112 and the external weather forecast data 132 to run one or more standby models 603, as indicated at 604. Running the deployed model 601, as indicated at 602, may produce deployed model results 606, while running the one or more standby models 603, as indicated at 604, may produce one or more standby model results 608. As discussed above with respect to FIGS. 1 and 2, the deployed model results 606 may be sent to the prediction management computing device 124. In turn, the prediction management computing device 124 may provide prediction information 140 to the system control computing device 142. In response to receiving the prediction information 140, the system control computing device 142 may perform an action based on the predicted power output, as indicated at 610. For example, the system control computing device 142 may perform a wind turbine control function as indicated at 612, may control one or more switches 208, and/or may send information regarding the predicted power output to the utility computing device 152.

In addition, as indicated at 614, the model computing device 116 may compare the accuracy of the deployed model results 606 and the standby model results 608 with actual sensor data 112 subsequently received from the wind turbine sensors 108. For example, for the periods of time for which the models 601 and 603 predicted the power output, the model computing device 116 may compare the actual power output, as indicated by subsequently-received sensor data 112 for that time period, with the predicted power outputs, as predicted by the deployed model 601 and the standby model 603. As indicated at 616, if one of the standby models 603 demonstrates superior performance to a deployed model 601 by a threshold amount, such as by consistently predicting the power output of the wind turbine more accurately than the deployed model 601 a threshold number of times, e.g., for a threshold number of time periods, the model computing device 116 may switch from using the deployed model 601 to using the standby model 603 as the deployed model.

Furthermore, as indicated at 620, the model computing device 116 may continually build and train new models based on the received sensor data 112, such as based on newly-received sensor data 112 received over the past 2 weeks, the past month, or the like. Thus, newer models 120 may have been trained using newer training data. For example, the deployed model 601 may have been trained a month ago. In meanwhile, the weather and/or season may have changed, so newer standby models 603 may have been trained using more recent data. If a standby model 603 beats the currently deployed model 601 consistently, e.g., by threshold number of times, then the deployed model 601 may be replaced by the standby model 603. There may be a plurality of these standby models 603 for each wind turbine, and the results of each may be compared with actual power generated and the results of the currently deployed models 601 to determine the best model to deploy for the next power prediction. This also enables dealing with the change of seasons, as discussed above. Accordingly, new standby models 603 may be continually produced, and deployed models 601 that are no longer being used may be deleted, retrained, or simply maintained as standby models. Blocks 602, 604, 614, 616, and 620 may be performed by the model application 118 executing on the model computing device 116, as discussed above, e.g., with respect to FIG. 1.

As another alternative, rather than using the results of a single deployed model 601, the model computing device 116 may execute a plurality of deployed models 601 using the received sensor data 112. For example, the model computing device 116 may execute three different deployed models 601 trained using three different sets of training data and/or different predictors. The model computing device 116 may then use the average, a weighted average, and/or median of the model results of these three models as the deployed model results 606 provided to the prediction management computing device 124. As still another example, the model computing device 116 may execute a plurality of different models trained using different sets of training data and/or different predictors. Then, as the deployed model results 606, the model computing device 116 may provide a distribution of all the results of each of the executed models. The prediction management computing device 124 may then perform one or more analysis functions based on the received distribution to determine the prediction information 140, such as based on determining the mean, standard deviation, and so forth.

Figure 7:
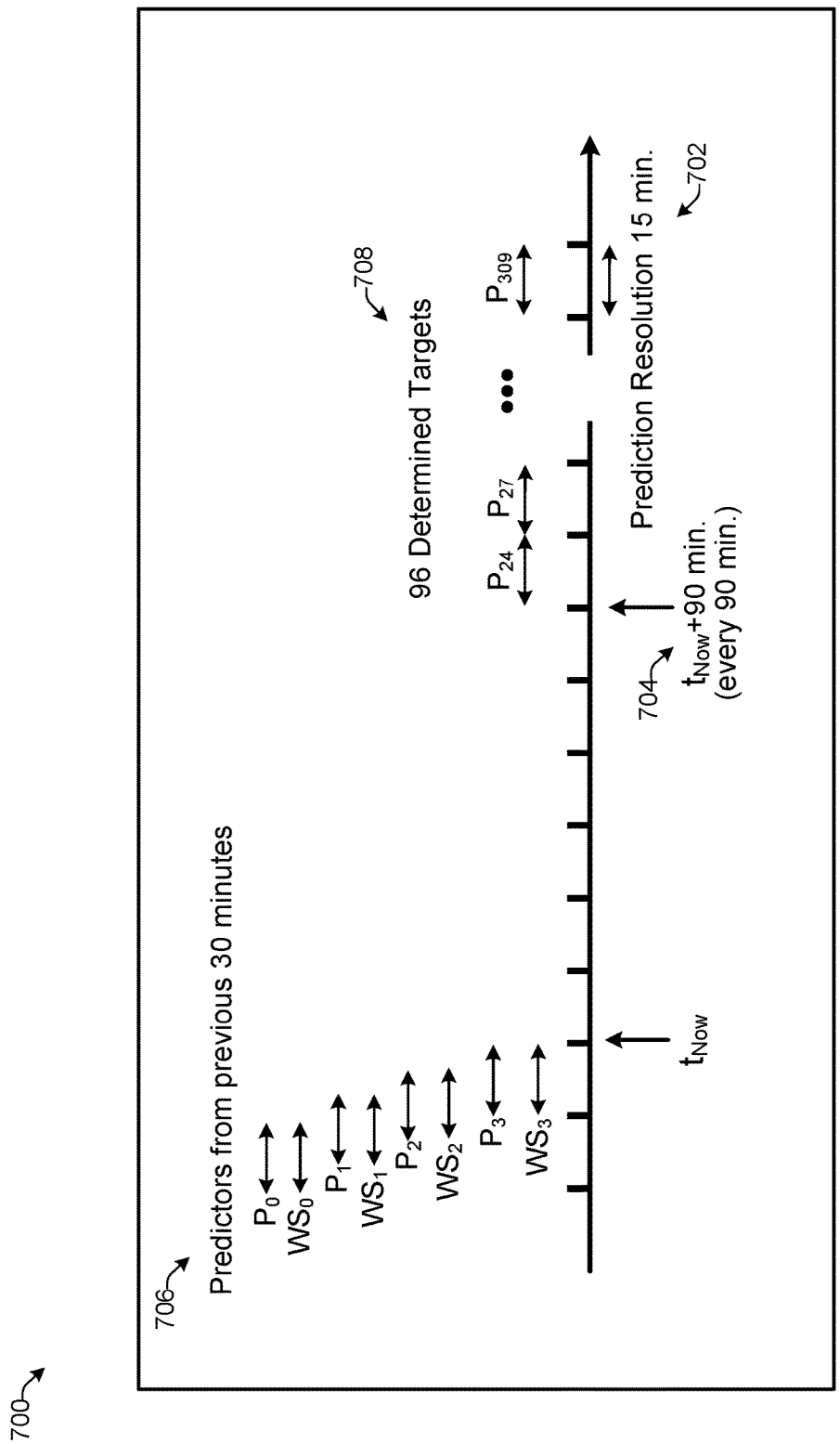
FIG. 7 illustrates an example of prediction specifications for predicting power output according to some implementations.

FIG. 7 illustrates an example 700 of determining predictors for predicting a power output according to some implementations. In this example, as indicated at 702, the prediction resolution is 15 minute time intervals, e.g., predicted average power output over each 15 minute interval. Furthermore, as indicated at 704 a new power output prediction for the next 24 hours is generated every 90 minutes. Accordingly, the prediction horizon is t+90 minutes to t+90 minutes+24 hours.

As indicated at 706, the predictors from the previous 30 minutes may be used as inputs for the models. As discussed above, these predictors may correspond to average power output measured over 15 minutes, with five-minute anchors between start and end times, so that the predictors are staggered by 5 minutes with respect to the next predictor in the time series from $P_0$ to $P_3$, where P is average power output measured over the particular time interval and WS is the actual averaged wind speed measured over the same time interval. In addition, while measured actual power output and wind speed are used as a predictors in this example, in other examples, additional predictors may also be used, as discussed above. As indicated at 708, based on the 15 minute prediction resolution for a 24-hour period, there may be 96 determined targets for the model(s) to predict the power output. In some cases, there may be 96 models for each wind turbine, i.e., one for each of the 96 time intervals.

Figure 8:
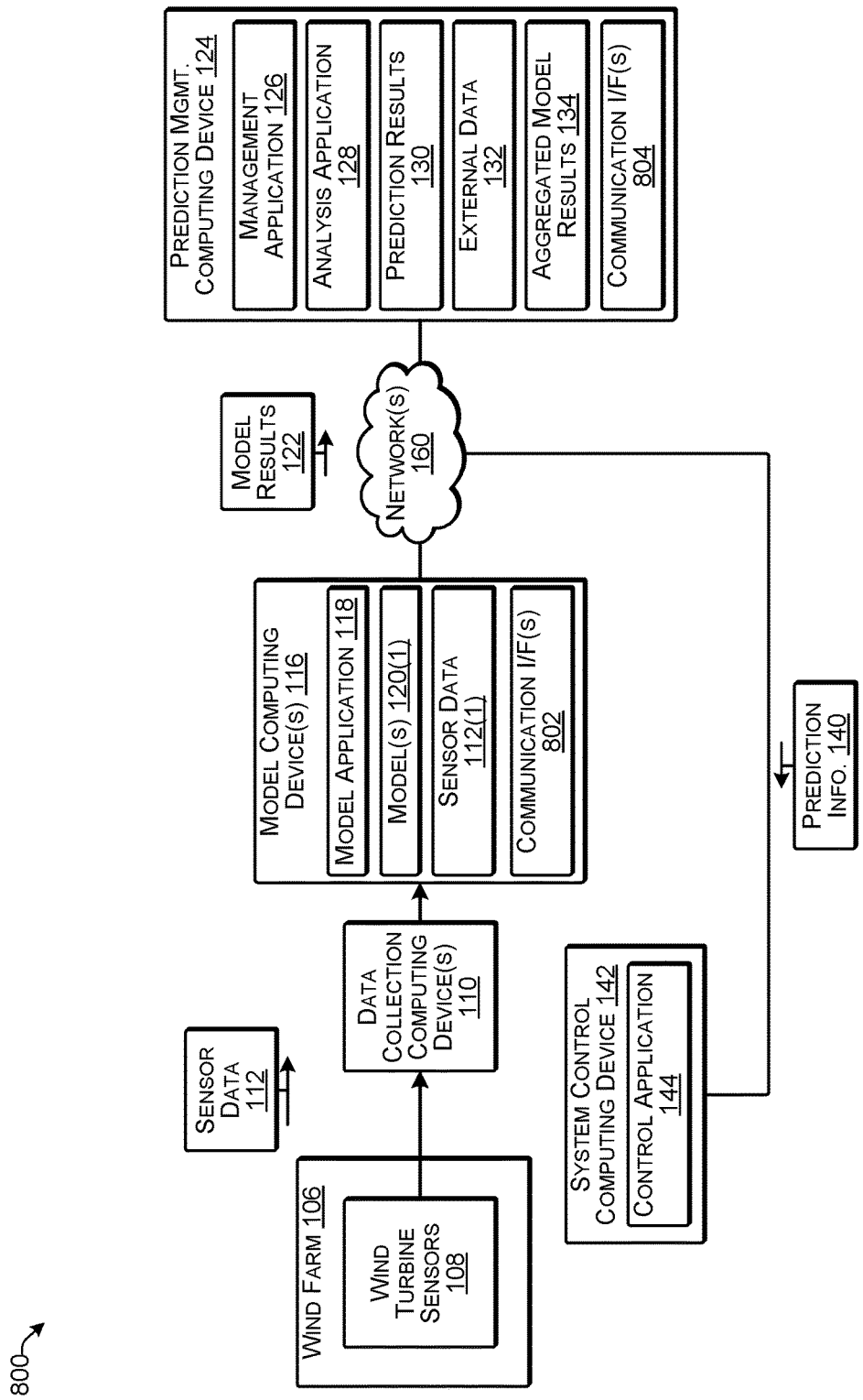
FIG. 8 illustrates an example system for predicting power output according to some implementations.

FIG. 8 illustrates an example system for predicting power output according to some implementations. In this example, the prediction management computing device 124 is located remotely from the wind farm 106, the associated data collection computing devices 110, and the model computing devices 116. Accordingly, the model computing devices 116 may use one or more communication interfaces 802 to send the model results 122 over the one or more networks 160 to the prediction management computing device 124. For example, the prediction management computing device 124 may be located on a cloud computing service, or at other remote network location such as accessible over the Internet.

The prediction management computing device 124 may use one or more communication interfaces 804 to send the prediction information 140 to the system control computing device 142, which may be located at or proximate to the wind farm. Alternatively, in other examples, the system control computing device 142 may also be remotely located from the windfarm 106 and accessible over the Internet, e.g., through the one or more networks 160. Regardless of the physical location of the system control computing device 142, the control application 144 may perform one or more actions based on the prediction information 140 as discussed above, e.g., with respect to FIGS. 1, 2, and 6.

Figure 9:
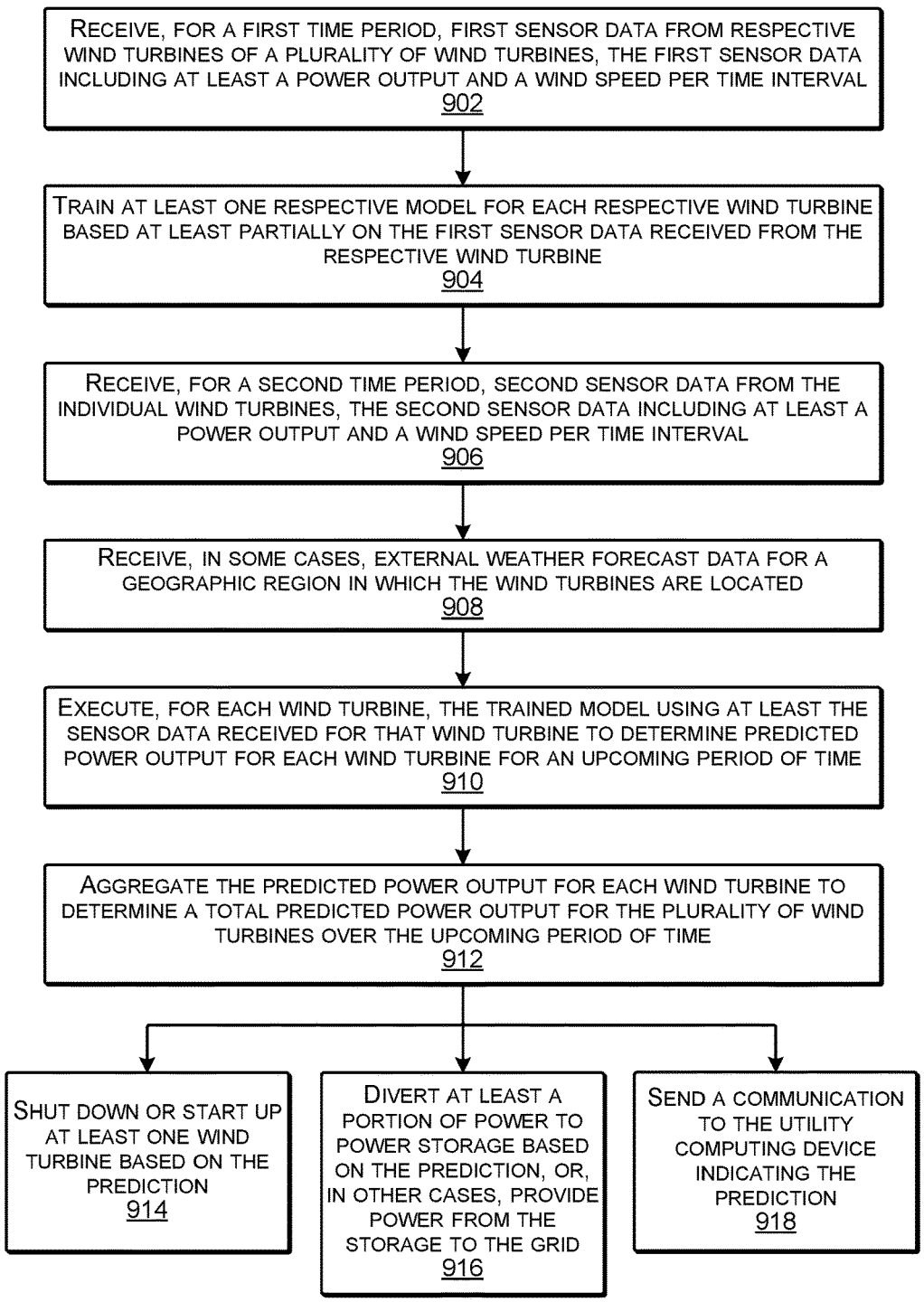
FIG. 9 is a flow diagram illustrating an example process for controlling a system based on predicted power output according to some implementations.
Figure 10:
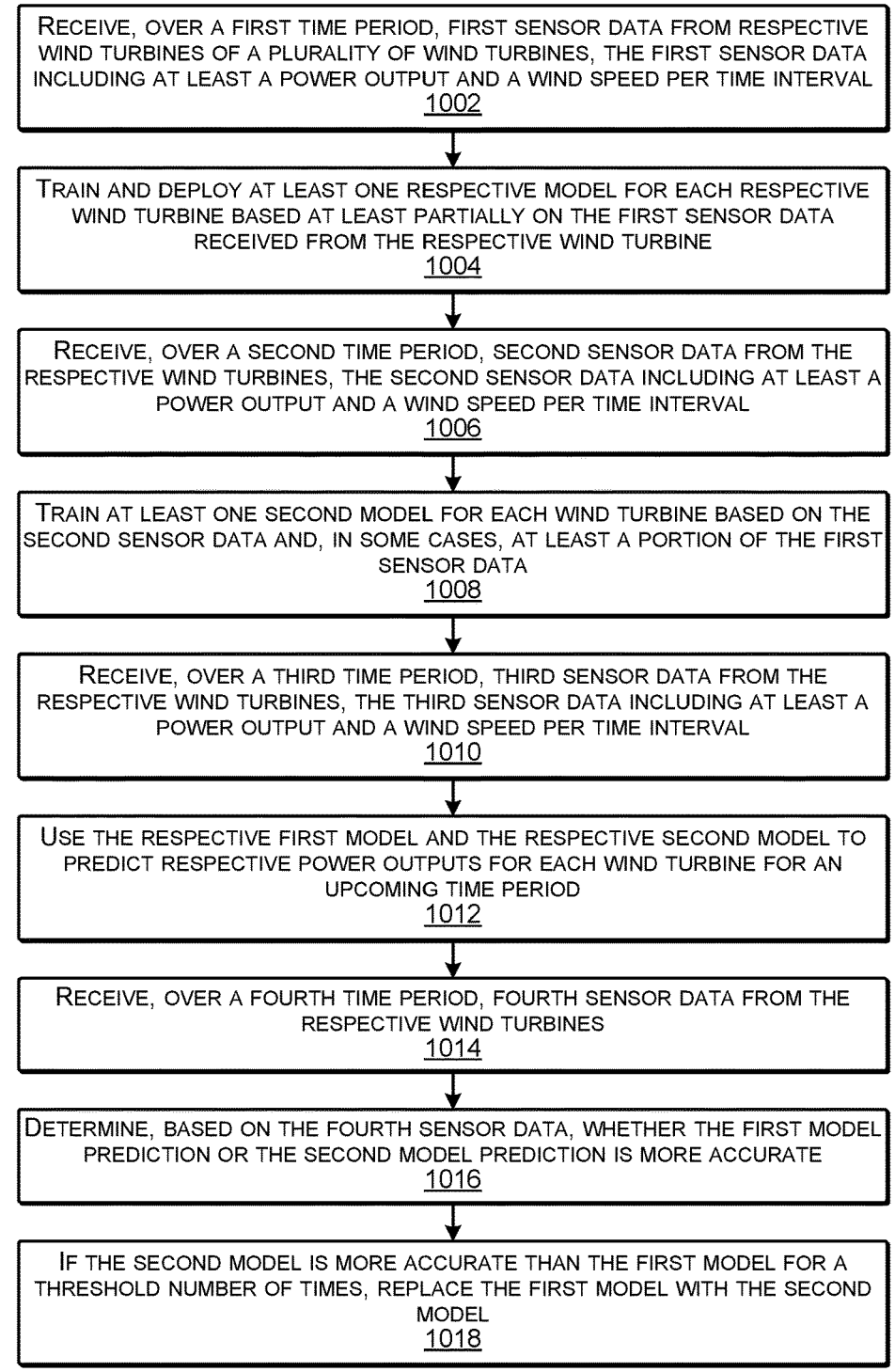
FIG. 10 is a flow diagram illustrating an example process for training multiple competing models and deploying a selected model for predicting power output according to some implementations.

FIGS. 9 and 10 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

FIG. 9 is a flow diagram illustrating an example process for controlling a system based on predicted power output according to some implementations. In some examples, the process 900 may be executed in part by the model computing device 116, in part by the prediction management computing device, and in part by the system control computing device 142, and/or other suitable computing device(s).

At 902, the computing device(s) may receive, for a first time period, first sensor data from respective wind turbines of a plurality of wind turbines, the first sensor data including at least a measured power output and wind speed per time interval. For example, there may be a plurality of time intervals in the first time period.

At 904, the computing device(s) may train at least one respective model for each respective wind turbine based at least partially on the first sensor data received from the respective wind turbine.

At 906, the computing device(s) may receive, for a second time period, second sensor data from the individual wind turbines, the second sensor data including at least a power output and a wind speed per time interval. For example, there may be a plurality of time intervals in the second time period.

At 908, the computing device(s) may receive, in some cases, external weather forecast data for a geographic region in which the wind turbines are located. For instance the external weather forecast data may include a predicted wind speed and wind direction for the geographic region in which the wind farm is located.

At 910, the computing device(s) may execute, for each wind turbine, a respective trained model using at least the sensor data received for that wind turbine, respectively, to determine predicted power output for each respective wind turbine for an upcoming time period.

At 912, the computing device(s) may aggregate the predicted power output for each wind turbine to determine a total predicted power output for the plurality of wind turbines over the upcoming time period.

At 914, the computing device(s) may send a communication to cause shut down or start up at least one wind turbine based on the prediction.

At 916, the computing device(s) may send a communication to cause activation of switch to cause diversion of at least a portion of power output to a power storage based on the prediction, or, in other cases, to cause activation of a switch to send stored power from the power storage to the power grid if the actual power output is less than predicted.

At 918, the computing device(s) may send a communication to the utility computing device indicating the prediction of the power output, e.g., an expected amount of power to be delivered to the power grid.

FIG. 10 is a flow diagram illustrating an example process for training and deploying a model for predicting power output according to some implementations. In some examples, the process 1000 may be executed at least partially by the model computing device or other suitable computing device(s). In some examples, the process of FIG. 10 may be combined with the process of FIG. 9.

At 1002, the computing device may receive, over a first time period, first sensor data from respective wind turbines of a plurality of wind turbines, the first sensor data including at least a power output and a wind speed per time interval.

At 1004, the computing device may train and deploy at least one respective model for each respective wind turbine based at least partially on the first sensor data received from the respective wind turbine.

At 1006, the computing device may receive, over a second time period, second sensor data from the respective wind turbines, the second sensor data including at least a power output and a wind speed per time interval.

At 1008, the computing device may train at least one second model for each wind turbine based on the second sensor data and, in some cases, at least a portion of the first sensor data.

At 1010, the computing device may receive, over a third time period, third sensor data from the individual wind turbines, the third sensor data including at least a power output and a wind speed per time interval.

At 1012, the computing device may use the respective first model and the respective second model to predict respective power outputs for each wind turbine for an upcoming time period based on the third sensor data.

At 1014, the computing device may receive, over a fourth time period, fourth sensor data from the respective wind turbines.

At 1016, the computing device may determine, based on the fourth sensor data, whether the first model prediction or the second model prediction is more accurate.

At 1018, if the second model is more accurate than the first model for a threshold number of times, the computing device may replace the first model with the second model.

Figure 11:
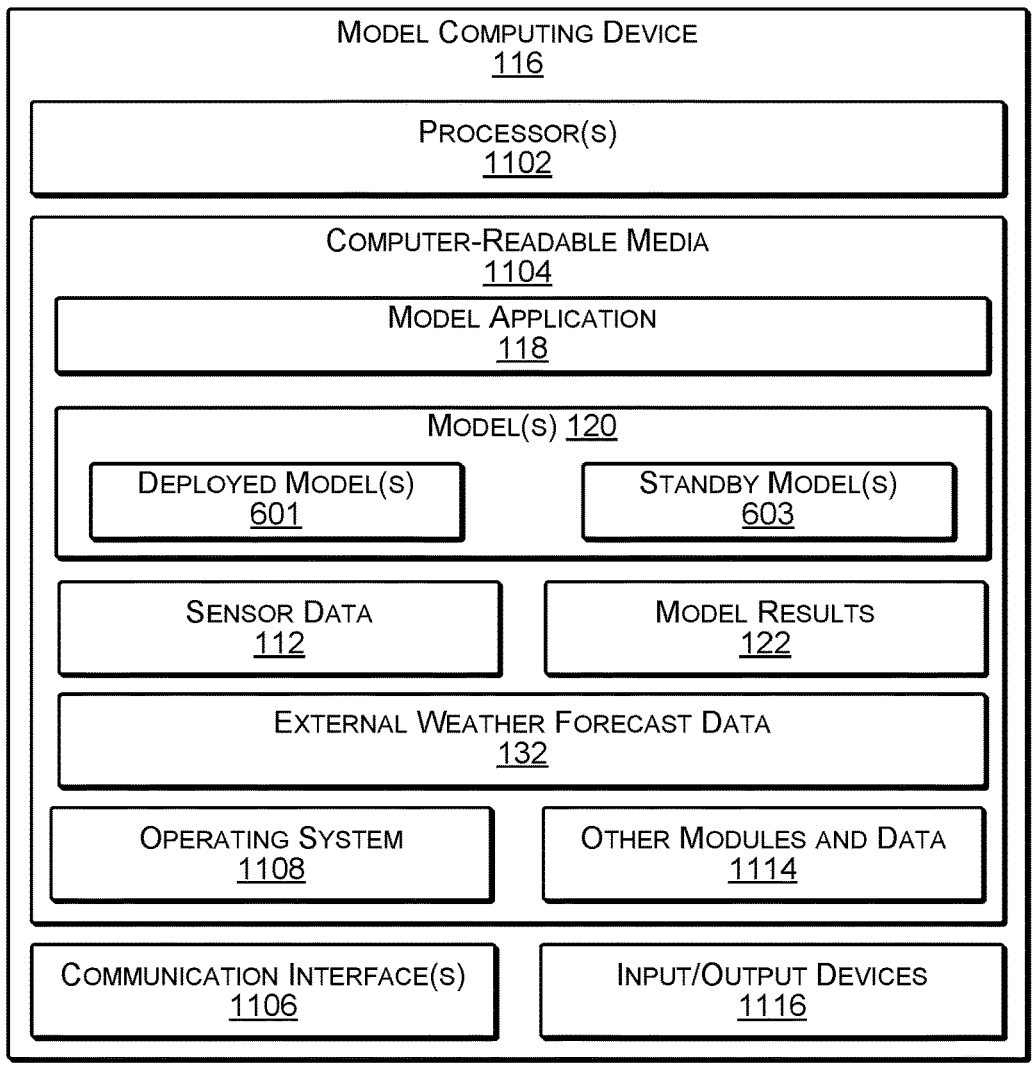
FIG. 11 illustrates an example model computing device according to some implementations.

FIG. 11 illustrates an example model computing device 116 according to some implementations. In some examples, the model computing device 116 may include o a RASPBERRY PI® computing device, a personal computer, an edge computing device, an Internet of things computing device, or other types of inexpensive low processing power computing devices that may be embodied in any number of ways. For instance, the programs, other functional components, and at least a portion of data storage may be implemented on the model computing device 116 and the model computing device 116 may be located in proximity to the wind farm, as discussed above. Alternatively, in other examples, the model computing device 116 may be implemented as a server, or other cloud-based or network-located computing device. Further, other computer architectures may additionally or alternatively be used. In addition, while the functional components and data are shown as being co-located on the same device in this example for convenience of discussion, in other examples, the functional components and data may be distributed across a plurality of computing devices at the same location or at a plurality of different locations in any desired manner.

In the illustrated example, the model computing device 116 includes one or more processors 1102, one or more communication interfaces 1106, and one or more computer-readable media 1104. Each processor 1102 may be a single processing unit or a number of processing units, and may include single or multiple computing units, or multiple processing cores. The processor(s) 1102 can be implemented as one or more central processing units, microprocessors, microcomputers, microcontrollers, digital signal processors, state machines, logic circuitries, and/or any devices that manipulate signals based on operational instructions. For instance, the processor(s) 1102 may be one or more hardware processors and/or logic circuits of any suitable type specifically programmed or configured to execute the algorithms and processes described herein. The processor(s) 1102 can be configured to fetch and execute computer-readable instructions stored in the computer-readable media 1104, which can program the processor(s) 1102 to perform the functions described herein.

The computer-readable media 1104 may include volatile and nonvolatile memory and/or removable and non-removable media implemented in any type of technology for storage of information such as computer-readable instructions, data structures, program modules, or other data. For example, the computer-readable media 1104 may include, but is not limited to, RAM, ROM, EEPROM, flash memory or other memory technology, optical storage, solid state storage, magnetic tape, magnetic disk storage, or the like. In addition, in the case that the model computing device is a server or other network computing device, the computing readable media may include RAID storage systems, storage arrays, network attached storage, storage area networks, cloud storage, or any other medium that can be used to store the desired information and that may be accessed by a computing device. Depending on the configuration of the model computing device 116, the computer-readable media 1104 may be a tangible non-transitory medium to the extent that, when mentioned, non-transitory computer-readable media exclude media such as energy, carrier signals, electromagnetic waves, and/or signals per se. In some cases, the computer-readable media 1104 may be at the same location as the model computing device 116, while in other examples, the computer-readable media 1104 may be partially remote from the model computing device 116, such as accessible over a network.

The computer-readable media 1104 may be used to store any number of functional components that are executable by the processor(s) 1102. In many implementations, these functional components comprise instructions or programs that are executable by the processor(s) 1102 and that, when executed, specifically program the processor(s) 1102 to perform the actions attributed herein to the model computing device 116. Functional components stored in the computer-readable media 1104 may include the model application 118, as discussed above, which may build, train, and replace the models herein. The functional components may include one or more computer programs, computer-readable instructions, executable code, or portions thereof that are executable to cause the processor(s) 1102 to perform various tasks such as executing models as described above. Additionally, an operating system 1108 may control and manage various functions of the model computing device 116. In some cases, the functional components may be stored in a storage portion of the computer-readable media 1104, loaded into a local memory portion of the computer-readable media 1104, and executed by the one or more processors 1102. Numerous other software and/or hardware configurations will be apparent to those of skill in the art having the benefit of the disclosure herein.

In addition, the computer-readable media 1104 may store data and data structures used for performing the functions and services described herein. For example, the computer-readable media 1104 may store the models 120, including one or more deployed models 601 and one or more standby models 603, the sensor data 112, the model results 122, and received external weather forecast data 132. The model computing device 116 may also include or maintain other modules and data 1114, which may include programs, drivers, etc., and other data used or generated by the functional components. Further, the model computing device 116 may include many other logical, programmatic, and physical components, of which those described above are merely examples that are related to the discussion herein.

The communication interface(s) 1106 may include one or more interfaces and hardware components for enabling communication with various other devices, such as over the one or more networks 160 or a LAN that is local to the wind farm. Thus, the communication interfaces 1106 may include, or may couple to, one or more ports that provide connection to the network(s) 160. For example, the communication interface(s) 1106 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel,), direct connections, as well as close-range communications such as BLUETOOTH®, and the like, as additionally enumerated elsewhere herein.

In addition, the model computing device 116 may include one or more input/output (I/O) devices 1116. Such I/O devices 1116 may include a display, speakers, a microphone, and various user controls (e.g., buttons, a joystick, a mouse, a keyboard, a keypad, a touch screen, etc.), and so forth.

Figure 12:
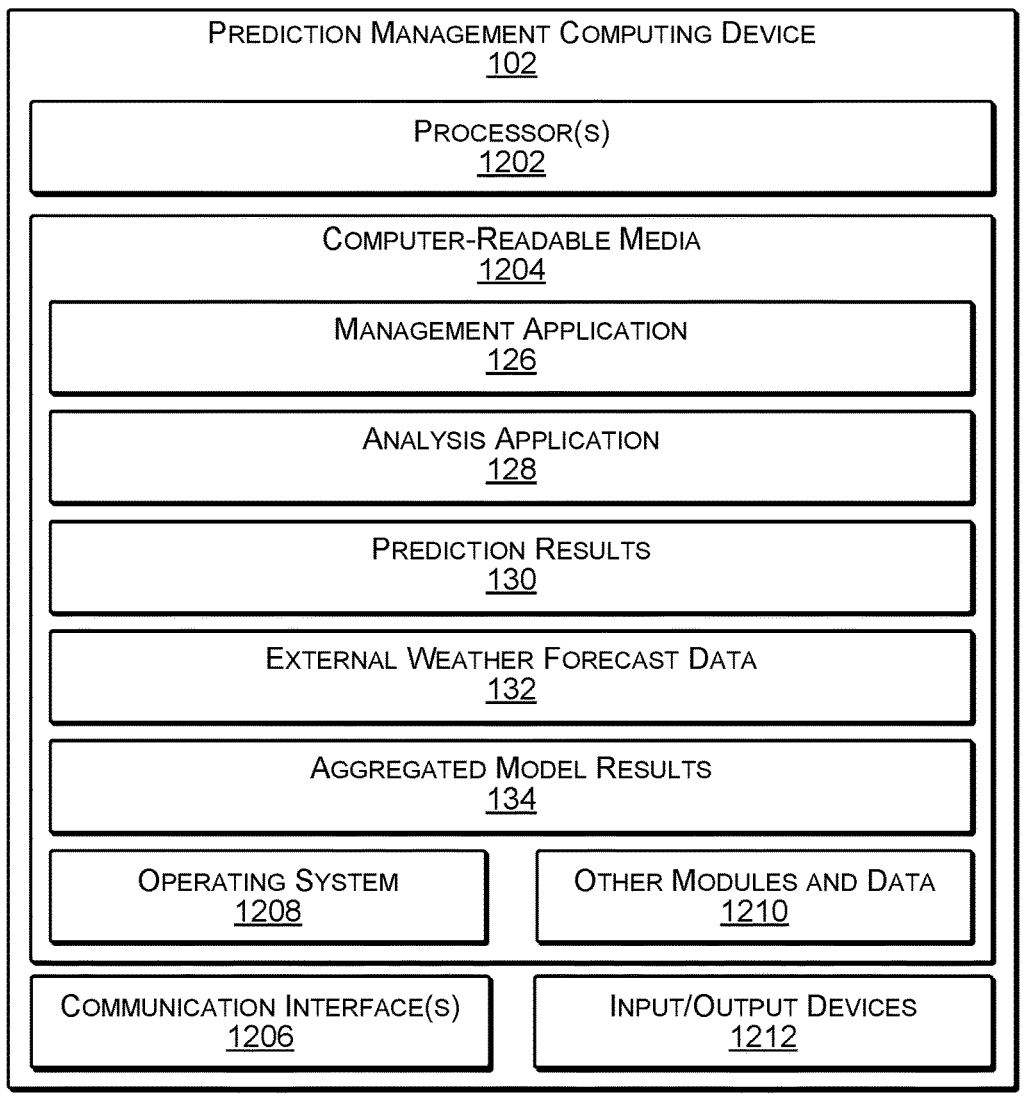
FIG. 12 illustrates an example prediction management computing device according to some implementations.

FIG. 12 illustrates an example prediction management computing device 124 according to some implementations. In some examples, the prediction management computing device 124 may include one or more servers, personal computers, or other types of computing devices that may be embodied in any number of ways. For instance, in the case of a personal computing device, prediction management computing device 124 may be located proximate to the windfarm and the model computing devices 112, such as in communication via a LAN. On the other hand, in the case of a server, the programs, other functional components, and at least a portion of data storage may be implemented on at least one server, or in a cluster of servers, a server farm, a data center, a cloud-hosted computing service, and so forth, although other computer architectures may additionally or alternatively be used. Further, while the functional components and data are shown as being co-located in this example for convenience of discussion, in other examples, the functional components and data may be distributed across a plurality of computing devices at the same location or at a plurality of different locations in any desired manner.

In the illustrated example, the prediction management computing device 124 includes, or may have associated therewith, one or more processors 1202, one or more communication interfaces 1206, and one or more computer-readable media 1204. Each processor 1202 may be a single processing unit or a number of processing units, and may include single or multiple computing units, or multiple processing cores. The processor(s) 1202 can be implemented as one or more central processing units, microprocessors, microcomputers, microcontrollers, digital signal processors, state machines, logic circuitries, and/or any devices that manipulate signals based on operational instructions. For instance, the processor(s) 1202 may be one or more hardware processors and/or logic circuits of any suitable type specifically programmed or configured to execute the algorithms and processes described herein. The processor(s) 1202 can be configured to fetch and execute computer-readable instructions stored in the computer-readable media 1204, which can program the processor(s) 1202 to perform the functions described herein.

The computer-readable media 1204 may include volatile and nonvolatile memory and/or removable and non-removable media implemented in any type of technology for storage of information such as computer-readable instructions, data structures, program modules, or other data. For example, the computer-readable media 1204 may include, but is not limited to, RAM, ROM, EEPROM, flash memory or other memory technology, optical storage, solid state storage, magnetic tape, magnetic disk storage. Further, in the case that the prediction management computing device 124 is a server located on a network, the computer-readable media 1204 may include RAID storage systems, storage arrays, network attached storage, storage area networks, cloud storage, or any other medium that can be used to store the desired information and that may be accessed by a computing device. Depending on the configuration of the prediction management computing device 124, the computer-readable media 1204 may be a tangible non-transitory medium to the extent that, when mentioned, non-transitory computer-readable media exclude media such as energy, carrier signals, electromagnetic waves, and/or signals per se.

In some cases, the computer-readable media 1204 may be at the same location as the prediction management computing device 124, while in other examples, the computer-readable media 1204 may be partially remote from the prediction management computing device 124.

The computer-readable media 1204 may be used to store any number of functional components that are executable by the processor(s) 1202. In many implementations, these functional components comprise instructions or programs that are executable by the processor(s) 1202 and that, when executed, specifically program the processor(s) 1202 to perform the actions attributed herein to the prediction management computing device 124. Functional components stored in the computer-readable media 1204 may include the management application 126 and the analysis application 128. Each of these functional components may include one or more computer programs, computer-readable instructions, executable code, or portions thereof that are executable to cause the processor(s) 1202 to perform various tasks, such as for receiving and processing data sent by the model computing devices 116. Additionally, an operating system 1208 may control and manage various functions of the prediction management computing device 124. In some cases, the functional components may be stored in a storage portion of the computer-readable media 1204, loaded into a local memory portion of the computer-readable media 1204, and executed by the one or more processors 1202. Numerous other software and/or hardware configurations will be apparent to those of skill in the art having the benefit of the disclosure herein.

In addition, the computer-readable media 1204 may store data and data structures used for performing the functions and services described herein. For example, the computer-readable media 1204 may store prediction results 130, external weather forecast data 132, and aggregated model results 134. The prediction management computing device 124 may also include or maintain other modules and data 1210, which may include programs, drivers, etc., and other data used or generated by the functional components. Further, the prediction management computing device 124 may include many other logical, programmatic, and physical components, of which those described above are merely examples that are related to the discussion herein.

The communication interface(s) 1206 may include one or more interfaces and hardware components for enabling communication with various other devices, such as over the one or more networks 160. Thus, the communication interfaces 1206 may include, or may couple to, one or more ports that provide connection to the network(s) 160. For example, the communication interface(s) 1206 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel,), direct connections, as well as close-range communications such as BLUETOOTH®, and the like, as additionally enumerated elsewhere herein.

In addition, the prediction management computing device 124 may include one or more input/output (I/O) devices 1212. Such I/O devices 1212 may include a display, speakers, a microphone, and various user controls (e.g., buttons, a joystick, a mouse, a keyboard, a keypad, a touch screen, etc.), and so forth.

Further, the system control computing device 142 may have a hardware configuration similar to the prediction management computing device 124, but with different functional components, such as the control application 144 executable thereon.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
one or more processors; and
one or more non-transitory computer-readable media storing executable instructions, which, when executed by the one or more processors, configure the one or more processors to perform operations comprising:
receiving, for a first time period, first sensor data from respective wind turbines of a plurality of wind turbines, the first sensor data including at least a power output and a wind speed per time interval, wherein the first time period includes a plurality of the time intervals;
training at least one respective model for each respective wind turbine based at least partially on the first sensor data received from the respective wind turbine;
receiving, for a second time period, respective second sensor data from the respective wind turbines;
executing, using the respective second sensor data received from the respective wind turbines, the at least one respective model that was trained using the first sensor data received from that respective wind turbine to determine, for each respective wind turbine, a predicted power output for an upcoming time period;

aggregating the predicted power outputs to determine a total predicted power output for the plurality of wind turbines; and based at least in part on the total predicted power output, at least one of:
sending a communication to cause a shut down or a start up of at least one wind turbine of the plurality of wind turbines;
sending a communication to cause activation of a switch to divert at least a portion of produced power to a power storage;
sending a communication to cause activation of a switch to send stored power from the power storage to a grid; or
sending a communication to a utility computing device indicating an expected power output for a least a portion of the upcoming time period.

2. The system as recited in claim 1, further comprising a plurality of model computing devices, each model computing device including at least one of the processors, wherein respective ones of the model computing devices are configured to train and execute the at least one respective model for a respective one of the wind turbines.

3. The system as recited in claim 1, further comprising a data collection computing device located proximate to a geographic region of the plurality of wind turbines for receiving the sensor data from the plurality of wind turbines, wherein the plurality of model computing devices are located proximate to the geographic region of the plurality of wind turbines and are able to communicate over a local area network with the data collection computing device.

4. The system as recited in claim 1, the operations further comprising:
receiving, from an external source, weather forecast data for a geographic region in which the plurality of wind turbines are located; and
training the at least one respective model for each of the respective wind turbines based at least partially on the weather forecast data, wherein executing, using the second sensor data received from each respective wind turbine, the at least one respective model that was trained using the first sensor data received from that respective wind turbine includes using received weather forecast data when executing the at least one respective model.

5. The system as recited in claim 1, the operations further comprising:
when executing the at least one respective model for a first one of the respective wind turbines, determining one or more second respective wind turbines within a threshold distance proximate to first respective wind turbine; and
wherein executing, using the second sensor data received from the first respective wind turbine, the at least one respective model that was trained using the first sensor data received from the first respective wind turbine includes using sensor data received from the one or more second respective wind turbines.

6. The system as recited in claim 1, wherein:
the at least one respective models are support vector machine regression models, and the sensor data used as inputs to execute the at least one respective models includes a time series of a plurality of time intervals received from the respective wind turbines, where a measured power output and measured wind speed are averaged over each time interval in the time series; and at least one of the time intervals in the time series at least partially overlaps another one of the time intervals in the time series.

7. The system as recited in claim 1, wherein, for a first one of the respective wind turbines, the at least one respective model is a first model, the operations further comprising:
training a second model using additional sensor data received from the first wind turbine prior to receiving the second sensor data;
executing the second model using the second sensor data to determine a second predicted power output for the first wind turbine;
based on subsequently received sensor data from the first respective wind turbine indicating an actual power output, determining whether predicted power output from the first model or the second model is closer to the actual power output; and
based at least partially on the predicted power output from the second model being closer to the actual power output, replacing the first model with the second model for the first respective wind turbine.

8. A method comprising:
training, by one or more processors, a respective model for each respective wind turbine of a plurality of wind turbines based at least partially on first sensor data received from the respective wind turbines for a first time period;
receiving, for a second time period, respective second sensor data from the respective wind turbines;
executing, using the respective second sensor data received from the respective wind turbines, the respective model trained for the respective wind turbine to determine, for each respective wind turbine, a predicted power output for an upcoming time period;
aggregating the predicted power outputs for the respective wind turbines to determine a total predicted power output for the plurality of wind turbines; and
based at least in part on the total predicted power output, performing at least one action.

9. The method as recited in claim 8, wherein performing at least one action comprises at least one of:
sending a communication to cause a shut down or a start up at least one wind turbine of the plurality of wind turbines;
sending a communication to cause activation of a switch to divert at least a portion of produced power to a power storage; or
sending a communication to cause activation of a switch to send stored power from the power storage to a grid.

10. The method as recited in claim 8, wherein performing at least one action comprises sending a communication to a utility computing device indicating an expected power output for a least a portion of the upcoming time period.

11. The method as recited in claim 8, further comprising configuring a plurality of model computing devices at a geographic region at which the wind turbines are located, wherein respective ones of the model computing devices are configured to train and execute the respective model for a respective one of the wind turbines.

12. The method as recited in claim 8, further comprising:
when executing the respective model for a first one of the respective wind turbines, determining one or more second respective wind turbines within a threshold distance proximate to first respective wind turbine; and
wherein executing, using the respective second sensor data received from the respective wind turbines, the respective model trained for the respective wind turbine includes using sensor data received from the one or more second respective wind turbines.

13. The method as recited in claim 8, wherein:
training a respective model for each respective wind turbine comprises training at least one respective support vector machine regression model for each respective wind turbine, wherein the sensor data used as inputs to execute the respective models includes a time series of a plurality of the time intervals received from the respective wind turbines, wherein a measured power output and measured wind speed are averaged over each time interval in the time series; and
at least one of the time intervals in the time series at least partially overlaps another one of the time intervals in the time series.

14. The method as recited in claim 8, wherein, for a first one of the respective wind turbines, the respective model is a first model, the method further comprising:
training a second model using additional sensor data received from the first wind turbine prior to receiving the second sensor data;
executing the second model using the second sensor data to determine a second predicted power output for the first wind turbine;
based on subsequently received sensor data from the first respective wind turbine indicating an actual power output, determining whether predicted power output from the first model or the second model is closer to the actual power output; and
based at least partially on the predicted power output from the second model being closer to the actual power output, replacing the first model with the second model for the first respective wind turbine.

15. A system comprising:
one or more processors; and
one or more non-transitory computer-readable media maintaining executable instructions, which, when executed by the one or more processors, program the one or more processors to perform operations comprising:
training a respective model for each respective wind turbine of a plurality of wind turbines based at least partially on first sensor data received from the respective wind turbines for a first time period;
receiving, for a second time period, respective second sensor data from the respective wind turbines;
executing, using the respective second sensor data received from the respective wind turbines, the respective model trained for the respective wind turbine to determine, for each respective wind turbine, a predicted power output for an upcoming time period;
aggregating the predicted power outputs for the respective wind turbines to determine a total predicted power output for the plurality of wind turbines; and
based at least in part on the total predicted power output, performing at least one action.

16. The system as recited in claim 15, wherein, for a first one of the respective wind turbines, the respective model is a first model, the operations further comprising:
training a second model using additional sensor data received from the first wind turbine prior to receiving the second sensor data;
executing the second model using the second sensor data to determine a second predicted power output for the first wind turbine for the upcoming time period;
based on subsequently received sensor data from the first respective wind turbine indicating an actual power output, determining whether predicted power output from the first model or the second model is closer to the actual power output; and
based at least partially on the predicted power output from the second model being closer to the actual power output, replacing the first model with the second model for the first respective wind turbine.

17. The system as recited in claim 15, wherein, for a first one of the respective wind turbines, the respective model is a first model, the operations further comprising:
training a second model using additional sensor data received from the first wind turbine prior to receiving the second sensor data;
executing the second model using the second sensor data to determine a second predicted power output for the first wind turbine for the upcoming time period; and
determining a predicted power output for the first wind turbine for the upcoming time period based on the predicted power output determined from the first model and the predicted power output determined from the second model.

18. The system as recited in claim 15, further comprising a plurality of model computing devices at a geographic region at which the wind turbines are located, each model computing device including at least one of the one or more processors, wherein respective ones of the model computing devices are configured to train and execute the respective model for a respective one of the wind turbines.

19. The system as recited in claim 15, wherein the operation of performing at least one action comprises performing at least one of:
sending a communication to cause a shut down or a start up at least one wind turbine of the plurality of wind turbines;
sending a communication to cause activation of a switch to divert at least a portion of produced power to a power storage;
sending a communication to cause activation of a switch to send stored power from the power storage; or
sending a communication to a utility computing device indicating an expected power output for a least a portion of the upcoming time period.

20. The system as recited in claim 15, the operations further comprising:
when executing the respective model for a first one of the respective wind turbines, determining one or more second respective wind turbines within a threshold distance proximate to the first respective wind turbine; and
wherein executing, using the respective second sensor data received from the respective wind turbines, the respective model trained for the respective wind turbine includes using sensor data received from the one or more second respective wind turbines.

* * * * *